US012381072B2

(12) United States Patent
Ibrahim

(10) Patent No.: US 12,381,072 B2
(45) Date of Patent: Aug. 5, 2025

(54) CURVED ION MOBILITY ARCHITECTURE

(71) Applicant: Battelle Memorial Institute, Richland, WA (US)

(72) Inventor: Yehia M. Ibrahim, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 488 days.

(21) Appl. No.: 17/861,076

(22) Filed: Jul. 8, 2022

(65) Prior Publication Data

US 2024/0014024 A1 Jan. 11, 2024

(51) Int. Cl.
*H01J 49/06* (2006.01)

(52) U.S. Cl.
CPC .......... *H01J 49/063* (2013.01); *H01J 49/068* (2013.01)

(58) Field of Classification Search
CPC ...... H01J 49/061; H01J 49/062; H01J 49/063; H01J 49/065; H01J 49/068; H01J 49/4225; G01N 27/622; G01N 27/623; G01N 27/68
See application file for complete search history.

(56) References Cited

U.S. PATENT DOCUMENTS

| | | | | |
|---|---|---|---|---|
| 8,507,852 | B2 | 8/2013 | Makarov | |
| 9,466,473 | B2 | 10/2016 | Giles et al. | |
| 10,424,474 | B2 | 9/2019 | Ibrahim | |
| 10,460,920 | B1 | 10/2019 | Smith et al. | |
| 11,119,069 | B2 | 9/2021 | Ibrahim et al. | |
| 11,219,393 | B2 | 1/2022 | Taghioskoui | |
| 2010/0301227 | A1 | 12/2010 | Muntean | |
| 2014/0124663 | A1* | 5/2014 | Green | H01J 49/06 250/290 |
| 2019/0004011 | A1 | 1/2019 | Garimella et al. | |
| 2020/0378922 | A1* | 12/2020 | Ibrahim | H01J 49/4225 |
| 2021/0382006 | A1 | 12/2021 | DeBord et al. | |
| 2022/0136999 | A1 | 5/2022 | Garimella et al. | |

FOREIGN PATENT DOCUMENTS

GB 2 447 330 A 10/2008

OTHER PUBLICATIONS

International Search Report and Written Opinion for related International Application No. PCT/US2023/069726, mailed Oct. 30, 2023, 7 pages.

* cited by examiner

*Primary Examiner* — David E Smith
*Assistant Examiner* — Hsien C Tsai
(74) *Attorney, Agent, or Firm* — Klarquist Sparkman, LLP

(57) ABSTRACT

Curved ion manipulation devices can provide relatively greater ion pathway lengths over conventional devices. Ions can be directed through one or more pairs of opposing curved surfaces of a curved ion manipulation structure. Each pair of opposing curved surfaces can be spaced apart radially relative to a common longitudinal axis of the ion manipulation structure to define a radial gap. Each pair of opposing curved surfaces can include a first electrode arrangement and a second electrode arrangement opposed to the first electrode arrangement. The first and second electrode arrangements can define an ion pathway and are configured to direct ions along the ion pathway and circumferentially through the radial gaps of the ion manipulation structure.

24 Claims, 8 Drawing Sheets

CURVED ION MOBILITY ARCHITECTURE

ACKNOWLEDGMENT OF GOVERNMENT SUPPORT

This invention was made with Government support under Contract DE-AC05-76RL01830 awarded by the U.S. Department of Energy and Grant No. GM130709 awarded by the National Institutes of Health. The Government has certain rights in the invention.

FIELD

The present disclosure relates to ion manipulation devices.

BACKGROUND

Ion manipulation techniques are increasingly employed in a myriad of applications that range from the detection of explosives to detecting biomarkers. The resolving power of such techniques is largely determined and improved by the total ion path length. However, problems in increasing ion path length within practical applications still remain.

SUMMARY

In a representative example of the disclosed technology, an ion manipulation device can include an ion manipulation structure having one or more pairs of opposing curved surfaces sharing a common longitudinal axis and radially spaced from one another by a radial gap along a radius of the ion manipulation structure, each pair of opposing curved surfaces having a first electrode arrangement and a second electrode arrangement opposed to the first electrode arrangement. The first and second electrode arrangements define an ion pathway through the radial gap and are configured to direct ions along the ion pathway and circumferentially through the radial gap.

In some examples, the first electrode arrangement extends along one of the pair of curved surfaces and the second electrode arrangement extends along the other of the pair of curved surfaces. The ion pathway, in some examples, has a plurality of circumferentially extending segments and a plurality of longitudinally extending segments. In some examples, the circumferentially extending segments have a first length and the longitudinally extending segments have a second length, the first length being greater than the second length. In other examples, the circumferentially extending segments have a first length and the longitudinally extending segments have a second length, the first length being less than the second length.

In some examples, the ion manipulation structure includes a single coiled structure. In other examples, the ion manipulation structure includes a pair of coiled structures. In still further examples, the ion manipulation structure includes concentric cylindrical structures.

In another representative example of the disclosed technology, an ion manipulation device can include a radial series of curved surfaces arranged about a common longitudinal axis, wherein adjacent pairs of the curved surfaces are spaced apart to define respective radial gaps and wherein adjacent pairs of the curved surfaces respectively comprise pairs of opposing electrode arrangements, wherein each pair of opposing electrode arrangements defines a respective ion pathway and is configured to direct ions through the ion pathway and circumferentially through its respective radial gap, and to another one of the radial gaps.

In some examples, the opposing electrode arrangements of one or more pairs of the adjacent curved surfaces define the ion pathway to have a plurality of circumferentially extending segments and a plurality of longitudinally extending segments. In other examples, the opposing electrode arrangements of one or more pairs of the adjacent curved surfaces define the ion pathway to be a helical ion pathway. In some examples, each pair of adjacent curved surfaces are surfaces of a pair of concentric structures. In some examples, a spacing between the curved surfaces of each of the adjacent pairs of curved surfaces is the same. In further examples, the ion pathways are connected to form a single continuous ion pathway. In other examples, the ion pathways of two radial gaps are coupled to one another by an ion escalator configured to direct ions from one of the radial gaps to the other of radial gap.

In further examples, the ion manipulation device can further include a drift tube electrode arrangement extending along the common longitudinal axis and configured to direct ions from a first end of the drift tube electrode arrangement to a second end of the drift tube electrode arrangement. In such examples, one or more pairs of the adjacent curved surfaces encircle the drift tube electrode arrangement.

In another representative example of the disclosed technology, a method can include directing ions through one or more pairs of opposing curved surfaces of a curved ion manipulation structure. Each pair of opposing curved surfaces are spaced apart radially relative to a common longitudinal axis of the ion manipulation structure to define a radial gap and each pair of opposing curved surfaces includes a first electrode arrangement and a second electrode arrangement opposed to the first electrode arrangement. The first and second electrode arrangements define an ion pathway and are configured to direct ions along the ion pathway and circumferentially through the radial gaps of the ion manipulation structure.

In some examples, the first and second electrode arrangements of one or more of the pairs of opposing curved surfaces define an ion pathway having a plurality of circumferentially extending segments and a plurality of longitudinally extending segments. In other examples, the first and second electrode arrangements of one or more of the pairs of opposing curved surfaces define a helical ion pathway.

In some representative method examples, the method further includes directing ions through a drift tube electrode arrangement extending along the common longitudinal axis and encircled by a pair of the opposing curved surfaces, the drift tube electrode arrangement configured to direct ions from a first end to a second end of the drift tube electrode arrangement.

In some examples, the pairs of opposing curved surfaces are defined by a pair of respective concentric structures. In other examples, the pairs of opposing curved surfaces form a single coiled structure. In still further examples, the pairs of opposing curved surfaces form a pair of coiled structures.

The foregoing and other objects, features, and advantages of the disclosed technology will become more apparent from the following detailed description, which proceeds with reference to the accompanying figures.

DETAILED DESCRIPTION

Figure 1A:
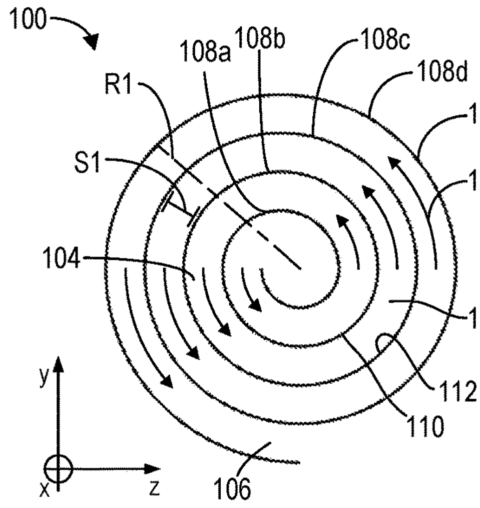
FIG. 1A is an elevated view of an ion manipulation device according to one configuration.

The disclosed technology is directed to devices, apparatus, and methods of manipulating, separating, or transporting ions, including the use of electric fields, to create field-defined ion pathways, traps, and conduits to manipulate ions with minimal or no losses over relatively greater ion path lengths and under a wide range of conditions, including in gases over various pressures.

The curved ion manipulation architectures described herein can be devices constructed of non-conductive or low conductivity materials capable of being fashioned into a variety of longitudinally extending curved configurations. These devices can be fashioned to have one or more pairs of adjacent curved surfaces arranged radially along a common axis, with each pair of adjacent surfaces being spaced apart and defining a respective radial gap. The radial gaps can be enclosed or semi-enclosed volumes with which conductive electrodes are positioned and/or embedded along. Electrodes can be positioned on the opposed curved surfaces that define a respective gap. Electric potentials provided to the electrodes can enable ion manipulation along the pathways defined along the curved surfaces and radial gaps of the device. The curved surfaces of the devices can be fashioned from a flexible or semi-flexible substrate suited for rolling, coiling, and/or otherwise shaping the substrate into a cylindrical structure with one or more radial gaps. Such substrates can be flexible printed circuit boards or another suitable non- or low conductive material. Additionally or alternatively, the ion manipulation devices described herein can be fashioned from additive manufacturing processes which can construct layer-by-layer the device into the desired rolled, coiled, concentric, and/or cylindrical configuration.

Opposing surfaces of pairs of adjacent curved surfaces of the device can include deposited, printed, embedded, or otherwise positioned electrodes in which electrical potentials can be applied to provide for ion confinement over circumferential, longitudinal, and/or non-linear ion pathways through the radial gaps of the device. Such electrode arrays can be printed on the substrate, such as via photolithography, and/or printed via additive manufacturing process, so as to embed the electrodes. The electrodes can be powered by an external power/voltage source or sources which can apply or provide various combinations of radio frequency (RF) and direct current (DC) (static or dynamic) potentials to the electrodes to confine and/or direct ions along the ion pathways. The electrical potentials can also act to confine the ions within a cross-section of the ion pathways, such as within the outer boundaries of the pathways, with minimal to no ion losses. The combination of RF and DC electrodes can be any arrangement whereby ions can remain within the cross-section of the ion manipulation device and ion pathways, whether the pathways are linear or nonlinear.

In some implementations, complex sequences of ion separations, transfers, path switching, and trapping can occur in the volume of the radial gaps defined by respective pairs of adjacent curved surfaces and opposing electrode arrangements. Ion confinement can be provided by biased or unbiased RF electric fields, which are generally applied in such a way that the RF fields of adjacent RF electrodes are out of phase with one another to form a "pseudo potential" or an "effective potential" that inhibit ions from approaching the electrodes and respective surfaces. RF electrodes are typically out of phase by 180 degrees. Confinement generally refers to inhibiting or restricting ion motion or relative ion motion in one or more directions, or to procedures or devices associated with achieving confinement. Longitudinal confinement can include inhibition of motion or relative motion along an axis of ion transport, such as an ion path. Longitudinal confinement can occur in a surfing mode traveling wave, wherein ions continue to move in a longitudinal direction, but cannot slip with respect to the traveling wave. Longitudinal confinement can also occur in devices such as accumulators or traps. Transverse confinement can include inhibition of motion in directions orthogonal to an axis of ion transport. In some configurations described herein, RF confinement or DC guard potentials or combinations can be used to achieve transverse confinement. Surrounding electrodes, for example, can provide a DC guard potential that is relatively high in comparison to the other and/or DC potentials employed, such that ions drifting transversely or orthogonal to an ion propagation axis are confined. Transverse confinement can occur independently of longitudinal confinement.

Confinement can be provided over a range of pressures (e.g., less than approximately 0.001 torr to approximately 1000 torr), and over a useful, broad, and adjustable mass to charge (m/z) range associated with the ions. In some implementations, ions are manipulated for analysis through mass spectrometry or with a mass spectrometer over a useful adz range, e.g., m/z 20 to greater than approximately 20,000. In some configurations, ion confinement volumes include gases or reactants. Arrangements of RF electrodes and traveling wave electrodes receive corresponding potentials that allow the creation of ion traps and/or conduits in the volume or gap between the electrode arrangements so that lossless or substantially lossless storage and/or movement of ions of the same or different polarities can be achieved, including without the application of static or superimposed DC potentials. For example, lossless manipulation can include losses of less than 0.1%, 1%, 5%, or 10% of ions injected into a corresponding ion confinement volume.

Traveling waves are typically created by dynamically applying DC potentials to a plurality of electrodes arranged in one or more sequences. Traveling wave electrode sets can be formed by one or more sequences of traveling wave electrodes situated in series. As the DC potentials are varied between adjacent electrodes of a traveling wave electrode sequence, a traveling wave can be formed with a speed based on the time-dependent variation of the DC potentials. The temporal change of the traveling waveforms can assume any one or combination of shapes, including a square, sinusoidal, triangular, symmetrical sawtooth, or asymmetrical sawtooth shape. Varying traveling wave characteristics can affect and manipulate various movements of ions having different ion mobilities, including producing ion confinement, lossless transport, and ion separation. One such characteristic is the traveling wave speed, with ions that have higher mobility moving or surfing with the traveling wave and ions that have lower mobility rolling over and lagging behind the traveling wave to allow ion separation. Another such characteristic is traveling wave amplitude, which can transport ions with lower ion mobilities with a corresponding increase in traveling wave amplitude. Traveling wave amplitudes are typically selected based on ion mobility characteristics and the desired ion manipulation to be in the range of greater than 0 V up to 30 V, 50 V, 80 V, 100 V, or greater. Traveling wave speeds are typically selected based on ion mobility characteristics and the desired ion manipulation to be in the range of less than 5 m/s, 20 m/s 50 m/s, 100 m/s, 200 m/s, 500 m/s, or 1000 m/s. Traveling wave frequencies are typically selected between 10 kHz and 200 kHz.

In general, traveling waves include at least one trough and at least one crest that propagates along a channel, formed by an electric potential waveform. When used for ion mobility separation, a TW can be continuous or can extend over multiple periods, however this is not a requirement. In other examples, a TW can be a single period (or even as little as half a period) of an oscillatory waveform. Multiple periods of a TW waveform can be regular or irregular, for example, stuttering or burst waveforms can be used in certain applications. When used for ion mobility separation, it can be desirable for the TW amplitude to be below a first threshold at which all ion species of interest can pass over crests from one trough to the next; such a configuration is considered to be in a separation mode. For some directional changes, such as with escalator configurations, it can be desirable for the TW amplitude to be above a second threshold at which no ion species of interest can pass over a crest, i.e., all species of interest experience longitudinal confinement within the TW and can be carried by the TW at the TW speed; such a configuration is considered to be a surfing mode. A TW amplitude that distinguishes surfing mode from separation mode can depend on frequency, wavelength, speed of propagation, or ion species. Some embodiments can be configured so that a surfing mode region is in a surfing mode for all ion species of interest, and a separation mode region is in a separation mode for all species of interest. For a given ion species, a transition between surfing mode and separation mode can also be made by changing the TW frequency while amplitude and wavelength are held fixed. In such a configuration, the TW can operate in separation mode above a threshold frequency, and in surfing mode below the threshold frequency. TW excitation and devices have been described, for example, in U.S. 2019/0004011A1, the contents of which are incorporated herein by reference.

The ion manipulation devices detailed provide relatively greater ion pathway lengths over typical devices. The cylindrical structures and ion pathways configurations, for instance, provide for substantially longer electrode arrangements while retaining a relatively small and compact footprint of the device. Such compact systems can be suitably implemented in portable and compact applications demanded for various applications and environments, without sacrificing resolution for ion manipulations, such as ion mobility separations.

Figure 1B:
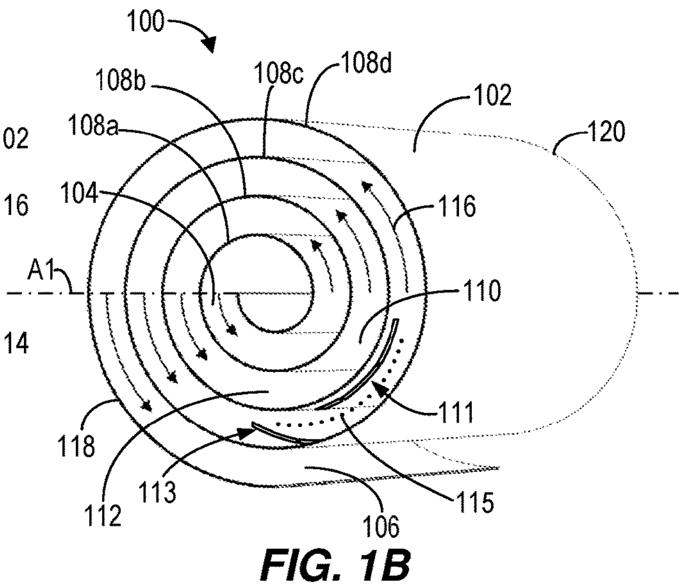
FIG. 1B is a perspective view of the ion manipulation device of FIG. 1A.

FIGS. 1A-1B depict a curved ion manipulation device 100 according to one example. In some examples, the device 100 can be fashioned from a single substrate 102 which forms the overall structure of the device. The device 100 can extend in a longitudinal direction, from a first end 118 to a second end 120. The device 100 can have a spiraled or coiled shape in which the substrate 102 defines a continuous, or near continuous, structure that spirals radially outwardly from an inner most region 104 of the device 100 to an outer most region 106. As shown in FIGS. 1A-1B, the coiled shape of the device 100 can define a plurality of curved layers 108*a*-108*d* positioned along a radius R1 and YZ plane of the device 100. In particular examples, each curved layer 108*a*-108*d* can be one of a series of curved layers arranged radially about a central or common longitudinal axis A1. Because of the spiraled shape, the curved layers 108*a*-108*d* can be arranged such that a given layer's radius increases within a range of radii as the layer spirals outward to a subsequent adjacent layer. Each curved layer 108*a*-108*d* of the device 100 can include a portion of a first curved surface 110 and a portion of a second curved surface 112. The first and second curved surfaces 110, 112 can correspond to opposite surfaces of the substrate 102. With the substrate 102 formed into the coiled shape, portions of the first curved surface 110 can be facing radially outwardly and away from the common longitudinal axis A1, while portions of the second curved surface 112 can be facing radially inwardly toward the common axis A1.

Between each pair of radially adjacent curved layers 108*a*-108*d* and curved surfaces 110, 112 extends a radial gap 114. The radial gap 114 can be defined by a space extending between the first curved surface 110 of one of the curved layers 108*a*-108*d* and the second curved surface 112 of an adjacent curved layer 108*a*-108*d* (e.g., a portion of the first curved surface 110 of curved layer 108*b* and a portion of the second curved surface 112 of curved layer 108*c* in FIGS. 1A-1B). Because of the coiled shape, the different curved layers 108*a*-108*d* can smoothly connect to form the radial gap 114 as a continuous coiled gap between two or more adjacent layers of the curved layers 108*a*-108*d*. At least a first electrode arrangement 111 can be patterned along the first curved surface 110 of one side of the radial gap 114 and a second electrode arrangement 113 opposing the first electrode arrangement can be patterned along the curved surface 112 across the radial gap 114 (e.g., RF electrodes and/or traveling wave electrodes, only a few being shown in FIG. 1B for clarity of illustration). The first and second electrode arrangements define an ion pathway 115 that extends through at least a portion of the radial gap 114 and device 100. In many examples, the first and second electrode arrangements 111, 113 can be similar to one another across the radial gap 114. For instance, first and second electrode arrangements 111, 113 can be radially aligned with one another across the gap 114 so that the patterns of the first and second electrode arrangements 111, 113 across the gap 114 mirror each other or provide a one-to-one correspondence. For example, the second electrode arrangement 113, which can be situated radially outward relative to the first electrode arrangement 111, can have electrodes and/or electrode gaps that are relatively longer in a circumferential direction than the opposing electrodes of the first electrode arrangement 111. The first and second electrode arrangements 111, 113 can be configured for longitudinal and transverse ion confinement to direct and manipulate ions along the ion pathway 115 of at least a portion of the radial gap 114, such as for ion mobility separations, with minimal to no ion losses. The electrode arrangements can also be employed for ion trapping. Within the spiral shape of device 100, the ion pathway 115 can continuously extend through the radial gap 114 between the inner and outer most regions 104, 106 in various ways, as discussed further below. In representative implementations, the radial distance across the radial gap 114 and between the opposed curved surfaces 110, 112 of the adjacent curved layers 108*a*-108*d* (e.g., between layers 108*a*, 108*b*) can have the same or substantially the same value S1 throughout the coiled shape of the device 100. Equal spacing S1 for the radial gap 114 can ensure that ion pathways are configured suitably for ion confinement consistently throughout the device 100. Additional example electrode arrangements and ion pathways are described further below.

In some implementations, the ion pathway 115 defined between the radial gap 114 by the electrode arrangements 111, 113 and the curved shape of the device 100 can have both linear and non-linear segments. Such segments can extend in longitudinal and/or circumferential directions (e.g., FIGS. 6A-7B). For instance, the first and second electrode arrangements 111, 113 and associated ion pathway 115 can have longitudinal segments extending in the +/−X directions parallel to the common axis A1 and circumferential segments that follow the curvature of the first and second curved surfaces 110, 112 and radial gap 114 (e.g., within a YZ plane). As the ions travel through the device 100 along the ion pathway 115 and the radial gap 114, the ions can follow an overall circumferential path. This overall circumferential path is indicated by arrows 116. Ions can be introduced, for example, at the inner most region 104 of the device 100 and directed along the ion pathway 115. As the ions travel through the device 100, the ions are directed through the longitudinally and circumferentially segments of the ion pathway 115 and follow the overall circumferential path 116 in a counterclockwise direction toward the outer most region 106. In this way, the ions travel along the ion pathway 115 sequentially defined by the curved layers 108*a*-108*d*. Although the overall circumferential path 116 of the ions is described as directed in a counterclockwise direction, it should be appreciated that the overall circumferential ion path 116 can be directed in a clockwise direction in the same manner described. Further, while the spiral shape of the device 100 spirals inwardly in a clockwise direction, other examples can spiral inwardly in a counterclockwise direction.

The outer most region 106 in the above example, can represent an ion outlet of the device 100, where the ions exit the device 100 to be received by another device, such as a mass spectrometer, an ion analyzer, and/or another ion manipulation device. The inner most region 104, similarly, can represent an ion inlet, where ions are introduced into the device 100 from another device, such as from an ion injector, ion trap, or other ion manipulation device. However, in some implementations, the outer most region 106 can be an ion inlet and the inner most region 104 can be ion outlet. As will become apparent from the following description, ion inlets and outlets can be positioned to couple ions to or from the radial gap 114 anywhere throughout the radial gap 114, and at the first end 118 or the second end 120 of the device 100. For example, ions can enter the device 100 via an inlet located at the radial gap 114 between curved layers 108*b*, 108*c* at the first end 118 and exit through an ion outlet located in the radial gap 114 between curved layers 108*c*, 108*d* at the second end 120.

The substrate 102 can be constructed of a single flexible or semiflexible material layer or set of layers (e.g., flexible printed circuit board), which is then coiled, rolled, or otherwise manipulated into the coiled shape shown in FIGS. 1A-1B to form the ion manipulation device 100. The substrate 102, for instance, can be initially planar, or otherwise in a non-coiled shape, with first and second surfaces (e.g., first and second surfaces 110, 112). The electrode arrangements 111, 113 can be positioned along or within the opposite surfaces of the substrate 102. The substrate 102 can then be coiled to form the curved surfaces 110, 112 with opposing first and second electrode arrangements 111, 113 patterned (e.g., in a mirrored and/or one-to-one configuration) such that the first and second electrode arrangements 111, 113 across the radial gap 114 define the ion pathway 115. With suitable static and/or dynamic voltages applied to the electrodes of the first and second electrode arrangements 111, 113, ions can be directed through the radial gaps 114 along the ion pathway 115. Additionally or alternatively, in some implementations, the device 100 can be constructed layer-by-layer, such as by an additive manufacturing process. In such implementations, the electrode arrangements 111. 113 and other features of the device 100 can be embedded within the substrate 102. In some implementations, a bracket or housing can retain the device 100 in a desired shape.

In various examples of the coiled device 100, other quantities of curved layers may be used. The device 100 illustrated in FIGS. 1A-1B, for instance, can be coiled comparatively more "tightly," allowing for more curved layers within the radius R1. In some examples, the device 100 can be coiled comparatively more "loosely" with relatively fewer turns within a given radius R1. The device 100 can also have any desired radius R1.

Figure 2A:
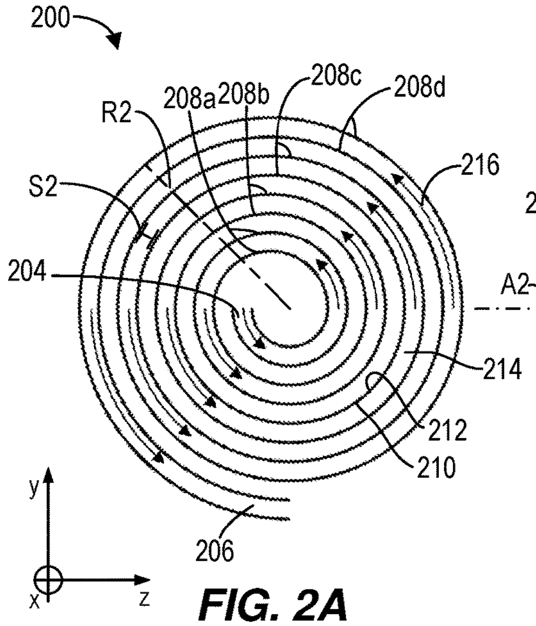
FIG. 2A is an elevated view of an ion manipulation device according to another configuration.
Figure 2B:
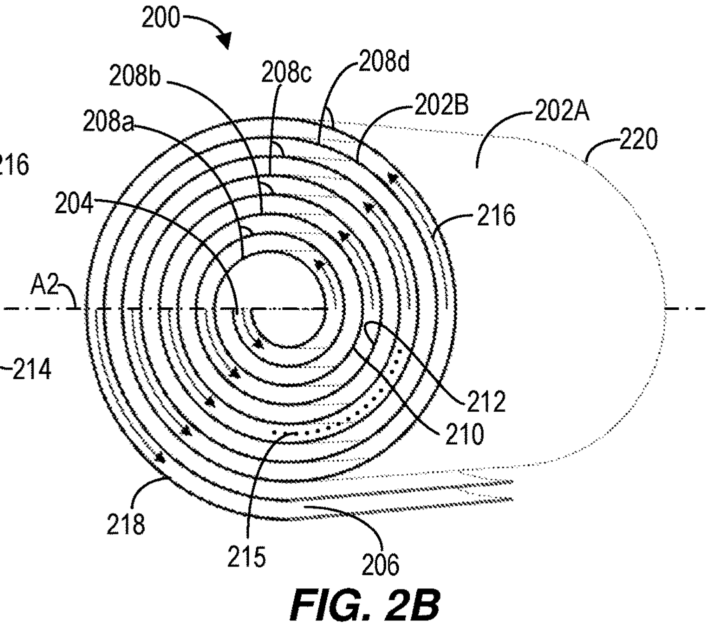
FIG. 2B is a perspective view of the ion manipulation device of FIG. 2A.

FIGS. 2A-2B illustrate a curved ion manipulation device 200 according to another example. The device 200 can be generally similar to the ion manipulation device 100 in various respects. The device 200 is fashioned from a pair of substrates 202A, 202B which can form a significant amount of the structure of device 200. The device 200 can have a spiraled or coiled shape that extends in a longitudinal direction, from a first end 218 to a second end 220, in which the pair of substrates 202A, 202B spiral side-by-side radially outwardly from an inner most region 204 of the device to an outer most region 206 in a continuous fashion.

As shown in FIGS. 2A-2B, the coiled shape of the device 200 can define pairs of opposed curved surfaces 208*a*-208*d* positioned along a radius R2 and YZ plane of the device 200. Each pair of opposed curved surfaces 208*a*-208*d* can be one pair within a plurality of paired curved surfaces 208*a*-208*d* arranged radially in series about a common longitudinal axis A2. The radius of each given pair of curved surfaces 208*a*-208*d* can increase within a range of radii as the opposed curved surfaces 208*a*-208*d* spiral outwardly to a subsequent pair of opposed curved surfaces 208*a*-208*d*. Each pair of opposed curved surfaces 208*a*-208*d* of the device 200 can include a portion of a first curved surface 210 facing radially outwardly and away from the common longitudinal axis A2 and a portion of a second curved surface 112 facing radially inwardly toward the common axis A2. The first curved surface 210 can correspond to one surface of the substrate 202A and the second curved surface 212 can correspond to the surface of substrate 202B adjacent and opposing the first curved surface 210 as the substrates 202A, 202B spiral radially outwardly.

Extending between each pair of opposed curved surfaces 208*a*-208*d* is defined a radial gap 214. The radial gap 214 can be defined by a space extending between the first curved surface 210 and the second curved surface 212 adjacent and opposed to the first curved surface 210 (e.g., the pair of curved surfaces 208*b* in FIGS. 2A-2B). The pairs of opposed curved surfaces 208*a*-208*d* can smoothly connect to one another to form the radial gap 214 as a continuous coiled gap between two or more pairs of opposed curved surfaces 208*a*-208*d*. At least a first electrode arrangement can be patterned along the first curved surface 210 on one side of the radial gap 214 and at least a second electrode arrangement opposing the first electrode arrangement can be patterned along the second curved surface 212 and across the radial gap 214. It should be appreciated that, while not shown, the first and second electrode arrangements of the device 200 can include similar electrode arrangements to the electrode arrangements 111, 113 described in connection with device 100 and FIG. 1B, or any of the other electrode arrangements described herein.

The first and second electrode arrangements define an ion pathway 215 that extends at least through a portion of the radial gap 214 and device 200. The first and second electrode arrangements can be similar to one another across the radial gap 214. The patterned first and second electrode arrangements can, for example, be radially aligned across the radial gap 214 and arranged such the electrode arrangements mirror each other or are in one-to-one correspondence with one another. As one example, the second electrode arrangement can be situated radially outward relative to the first electrode arrangement and have electrodes and/or electrode gaps that are relatively longer in a circumferential direction than the opposing electrodes and electrode gaps of the first electrode arrangement situated radially inward. The ion pathway 215 can extend through the radial gap 214 continuously between the inner and outer most regions 204, 206. The ion pathway 215 defined between the radial gap 214 by the first and second electrode arrangements and the curved shape of the device 200 can also have linear and/or non-linear segments (e.g., FIGS. 6A-7B). The first and second electrode arrangements and ion pathway 215, for instance, can have longitudinal segments extending in the +/−X directions parallel to the common axis A2 and circumferential segments that follow the curvature of the first and second curved surfaces 210, 212 and radial gap 214 (e.g., within a YZ plane). Ions directed through the radial gap 214 and along ion pathway 215 of device 200 can follow an overall circumferential path, in either a clockwise or counterclockwise direction. The overall circumferential path is indicated by arrows 216.

Ions can be introduced into and exit the device 200 via ion inlets and outlets positioned to couple ions to or from the radial gap 214 anywhere throughout the radial gap 214, and either at the first end 218 or the second end 220 of the device 200. For example, ions can enter and/or exit the device 200 at the first end 218 or second end 220 via the radial gap 214 at the inner most region 204, the outer most region 206, and/or anywhere between the inner and outer most regions 204, 206.

As mentioned, the ion manipulation device 200 can be constructed of a pair of substrates 202A-202B. The substrates 202A-202B of the device 200 can be flexible or semiflexible substrate material layer or set of layers (e.g., flexible printed circuit board), which can be coiled, rolled, or otherwise manipulated from a planar or otherwise non-coiled shape into the coiled shape shown in FIGS. 2A-2B. The substrates 202A-202B can be retained in this shape via a bracket, housing, and/or due to the rigidity of the substrate material. In representative examples, the substrates 202A-202B do not have electrode arrangements on both surfaces. Rather, one surface of each substrate 202A-202B (e.g., curved surfaces 210, 212) can have patterned and/or embedded within, one of the first and second electrode arrangements defining the ion pathway 215 through the radial gap 215. For example, the substrates 202A-202B can be coiled in parallel with one another such that the corresponding segments of the first and second electrode arrangements are opposed and radially aligned, and similar to one another across the radial gap 214. Alternatively, the device 200 can be fashioned layer-by-layer, such as by an additive manufacturing process.

The coiled shape of the device 200 can, in some examples, include any desired quantity of opposed curved surfaces 208*a*-208*d*. In particular, the device 200 can be coiled comparatively more “tightly,” allowing for more pairs of opposed curved surfaces 208*a*-208*d* within the radius R2, or coiled comparatively more “loosely” with relatively fewer pairs of opposed curved surfaces 208*a*-208*d* within the radius R2. The device 200 can also have any desired radius R2 and the distance across the radial gap 214 and between the curved surfaces 210, 212 of the opposed curved surfaces 208*a*-208*d* can have the same or substantially the same value S2 throughout. This can ensure that ion pathways are configured suitably for ion confinement consistently throughout the device 200.

Figure 3A:
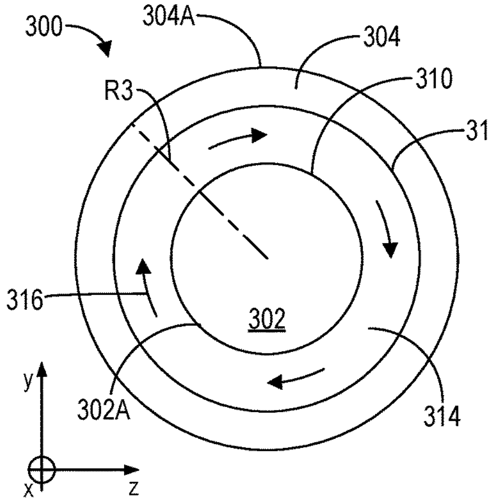
FIG. 3A is an elevated view of an ion manipulation device according to another configuration.
Figure 3B:
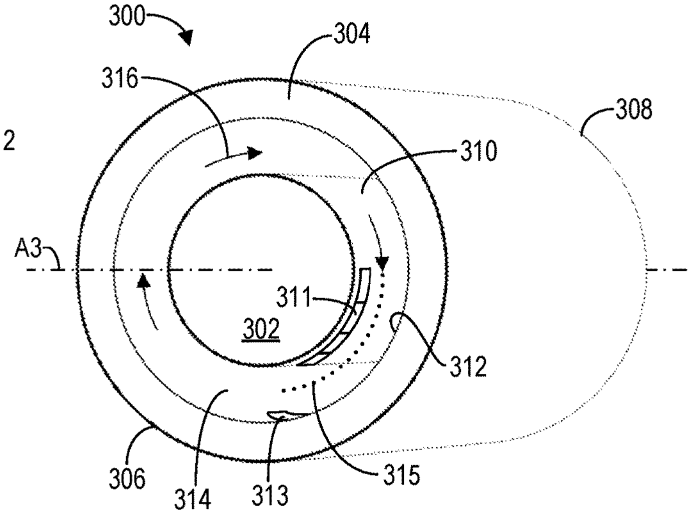
FIG. 3B is a perspective view of the ion manipulation device of FIG. 3A.

FIGS. 3A-3B depict a curved ion manipulation device 300 according to another example. The device 300 can be constructed of a pair of substrates 302A, 304A which form cylindrical inner and outer structures 302, 304. The inner and outer structures 302, 304 can be concentrically aligned and extend in a longitudinal direction from a first end 306 to a second end 308 of the device (e.g., in the +/−X directions). The inner and outer structures 302, 304 can also define a pair of opposed curved surfaces 310, 312 that are positioned along a radius R3 and YZ plane of the device 300 such that the curved surfaces 310, 312 are arranged about a central or common longitudinal axis A3. The radius of the curved surfaces 310, 312 can increase and decrease with increasing and decreasing distance between the curved surfaces 310, 312 and the common axis A3. The inner structure 302 can define a central portion of the device 300 and include a first curved surface 310 and the outer structure 304 can include a second curved surface 312 adjacent and opposed to the first surface 310 of the inner structure 302. The first curved surface 310 can be a radially outwardly facing surface facing away from the longitudinal axis A3 and the second curved surface 312 can be a radially inwardly facing surface facing toward the first curved surface 310 and longitudinal axis A3.

Between the inner and outer structures 302, 304 and opposed curved surfaces 310, 312 extends a radial gap 314. The radial gap 314 can be defined by the space extending between the first curved surface 310 of the inner structure 302 and the second surface 312 of the outer structure 304. At least a first electrode arrangement 311 can be patterned along the first curved surface 310 on one side of the radial gap 314 and at least a second electrode arrangement 313 opposing the first electrode arrangement 311 can be patterned along the curved surface 312 across the radial gap 314. For illustrative purposes, only a few electrodes of the first and second electrode arrangements 311, 313 are shown in FIG. 3B.

The first and second electrode arrangements 311, 313 define an ion pathway 315 that extends through at least a portion of the radial gap 314 and in between the first and second curved surfaces 310, 312. The first and second electrode arrangements 311, 313 can be similar to one another and be configured for longitudinal and transverse ion confinement to direct and manipulate ions along the ion pathway 315 of at least a portion of the radial gap 314, such as for ion mobility separation, ion trapping, and/or other ion manipulation. The first electrode arrangement 311, for example, can be situated radially inward relative to the second electrode arrangement 313 and have respective electrodes and/or electrode gaps that are relatively shorter in a circumferential direction than the opposing electrodes and/or electrode gaps of the second electrode arrangement 313 situated radially outward. The first and second electrode arrangements 311, 313, in this way, can be patterned to mirror one another or provide one-to-one correspondence.

Figure 7A:
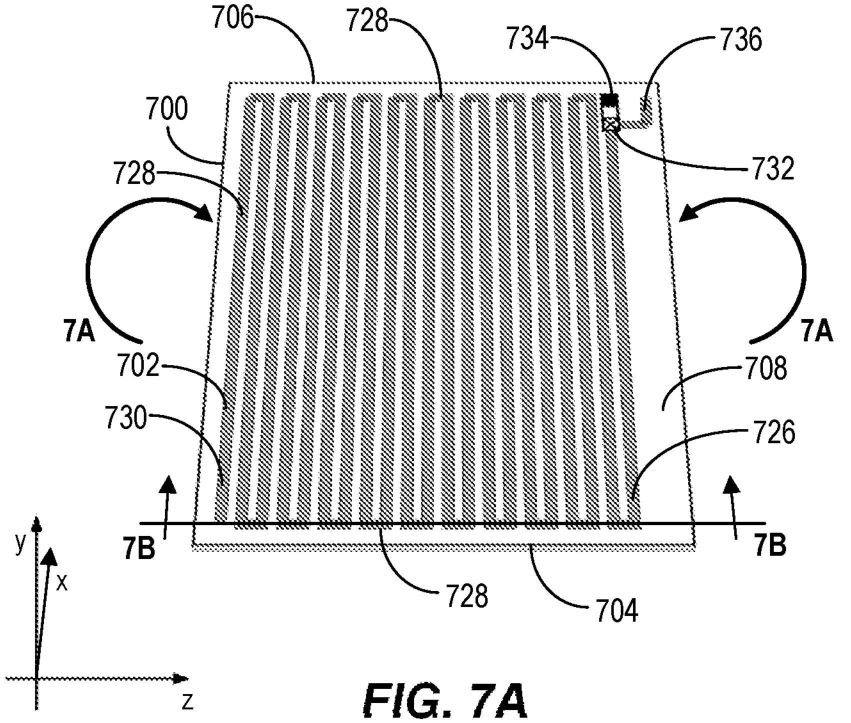
FIG. 7A is a perspective view of a substrate and electrode arrangement according to another example.
Figure 7B:
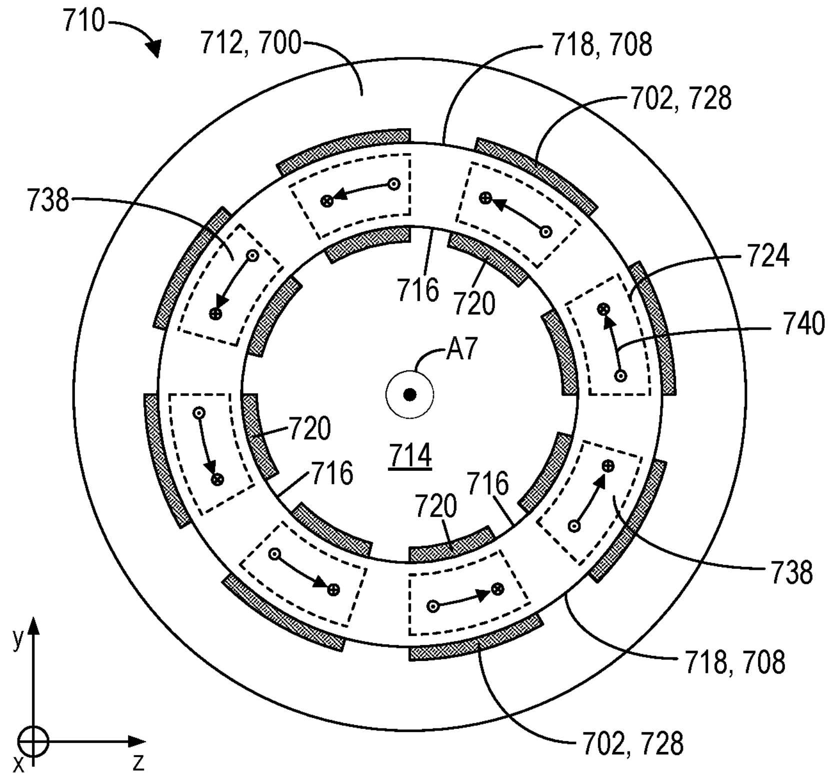
FIG. 7B is an elevated view of an ion manipulation device comprising the substrate and electrode arrangement of FIG. 7A.
Figure 8:
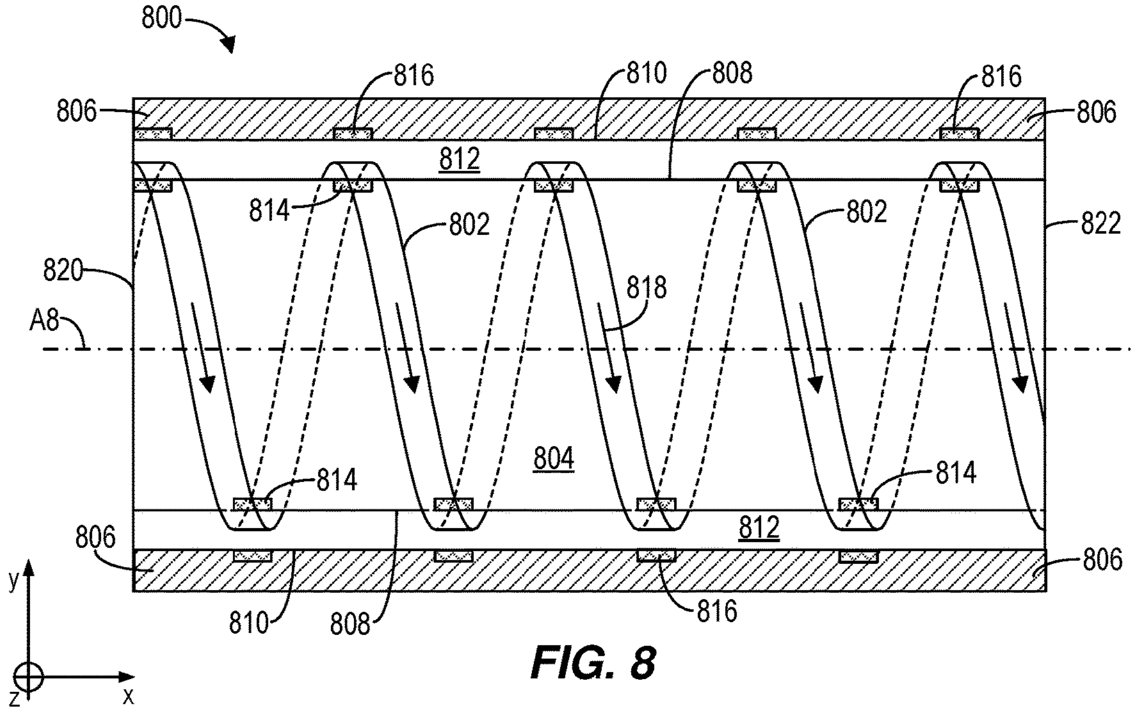
FIG. 8 is a partial cross-sectional view of an ion manipulation device having a helical ion pathway.

The ion pathway 315 defined between the radial gap 314 by the first and second electrode arrangements 311, 313 and curved shape of the device 300 can have linear and/or non-linear segments (e.g., FIGS. 6A-7B), or a helical configuration (e.g., FIG. 8). For instance, the first and second electrode arrangements 311, 313 and ion pathway 315 can have longitudinal segments extending in the +/−X directions parallel to the common axis A3 and circumferential segments that follow the curvature of the radial gap 314 and the first and second surfaces 310, 312 of the inner and outer structures 302, 304 (e.g., within a YZ plane of the device 300). As indicated by arrows 316, as the ions are directed along the ion pathway 315 of the radial gap 314 and through the device 300, the ions can follow an overall circumferential path in either a clockwise or counterclockwise direction.

In various other implementations, the ion pathway 315 of the radial gap 314 can have a helical or coiled configuration. As one example, the first and second electrode arrangements 311, 313 defining the ion pathway 315 can be arranged in a helical pattern along the opposing curved surfaces 310, 312 and the length of the device 300. In this helical configuration, ions can be directed along the ion pathway 315 and through the radial gap 314 circumferentially (e.g., as indicated by arrows 316) about the inner structure 302 and common axis A3 in both the +/−YZ directions, and along the length of the device 300 in the +X or −X direction (FIG. 8).

Ions can be introduced into the radial gap 314 of the device 300 via an ion inlet and exit the radial gap 314 of the device 300 through an ion outlet. The ion inlets and outlets can be positioned anywhere throughout the radial gap 314. As illustrated in FIGS. 3A-3B, for instance, ions can be introduced at the first end 306 of the device 300 via an ion inlet located anywhere along the radial gap 314 and between respective first and second curved surfaces 310, 312. Ions can then exit the radial gap 314 of the device 300 at either the first end 306 and/or second end 308, depending on the configuration of the ion pathway 315 extending through the radial gap 314, e.g., a helical configuration or a combination of the linear and nonlinear segments. As one example, two longitudinal segments of the ion pathway 315 can define an ion inlet and an ion outlet, respectively, that are located at the same end of the device 300, e.g., at the first end 306 or second 308.

Figure 9:
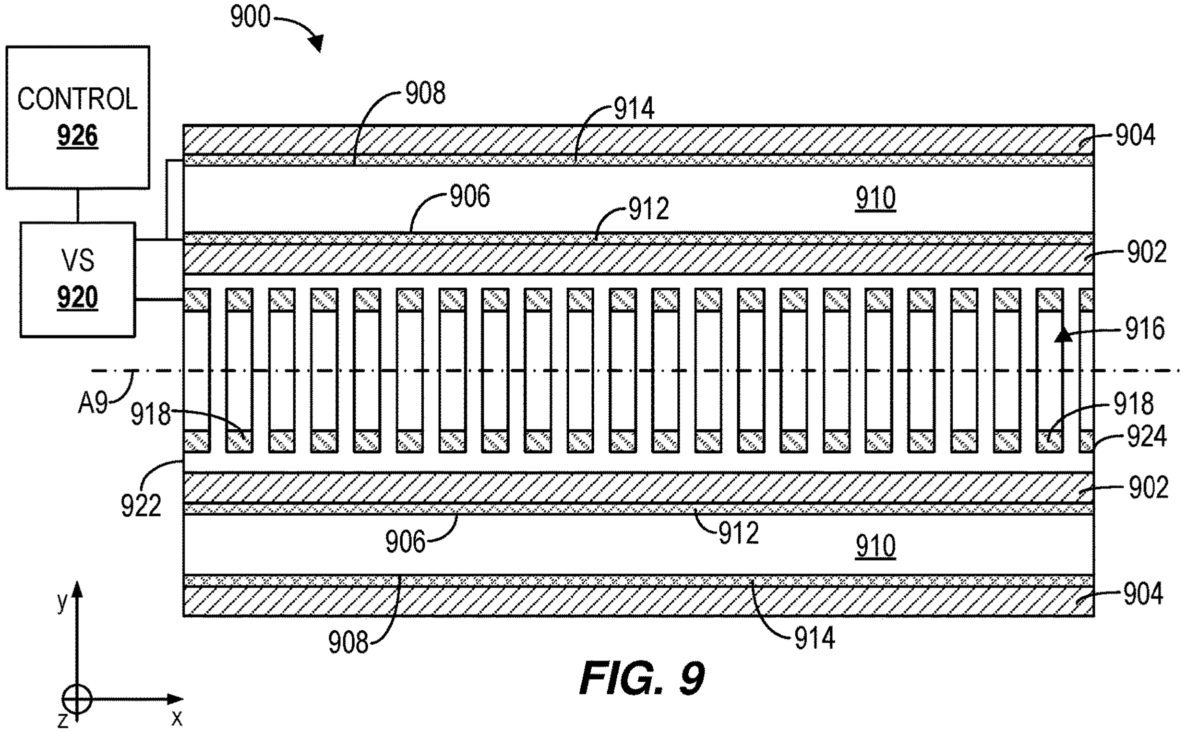
FIG. 9 is a cross-sectional view of an ion manipulation device having a drift tube extending therethrough.

One or both substrates 302A, 304A that form the inner and outer structures 302, 304 of the ion manipulation device 300 can be constructed of a flexible or semiflexible substrate material layer or set of layers (e.g., flexible printed circuit boards). The outer structure 304, for example, can be fashioned from a single substrate 304A which is curved or otherwise shaped into the tube-like cylindrical structure such that the outer structure 304 defines the second curved surface 312 and encircles the inner structure 302. The inner structure 302 can be fashioned from a solid or hollow substrate 302A which extends coaxially through the outer structure 304. In some implementations, the inner structure 302 can be fashioned into a tube-like cylindrical structure similar to that of the outer structure 304. In such implementations, the inner structure 302 can have another ion manipulation device, such as a drift tube, coaxially aligned with and extending through the inner structure 302 (FIG. 9). Additionally or alternatively, in some implementations, the device 300 can be constructed layer-by-layer, such as by an additive manufacturing process. In such implementations, the electrode arrangements and other features of the device can be embedded within the structures 302, 304.

Figure 4A:
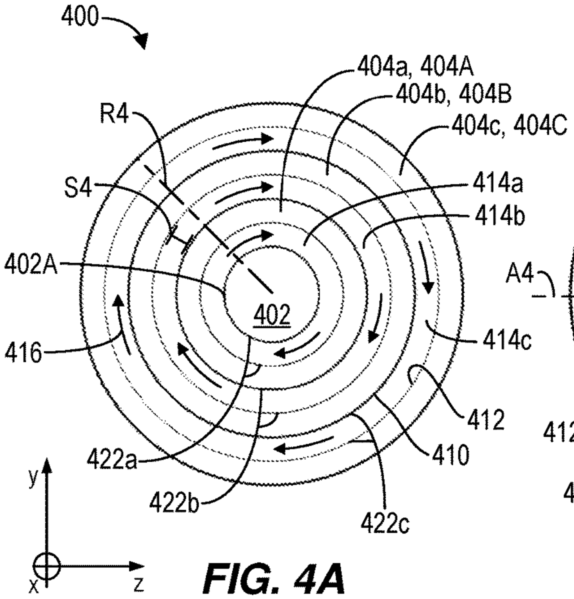
FIG. 4A is an elevated view of an ion manipulation device according to another configuration.
Figure 4B:
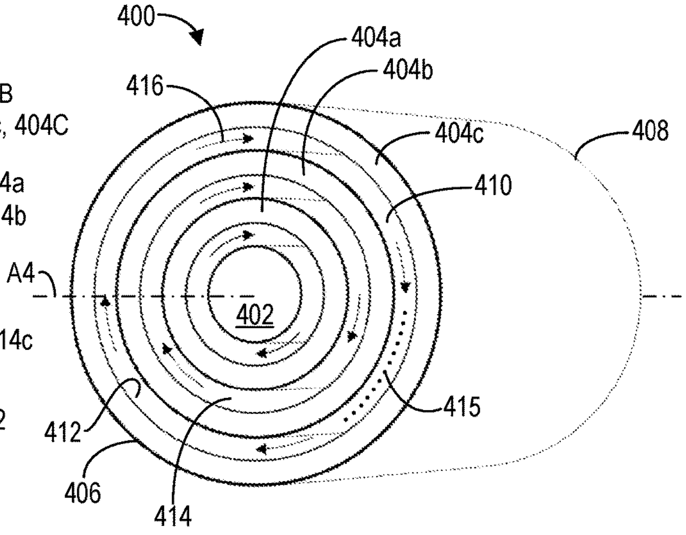
FIG. 4B is a perspective view of the ion manipulation device of FIG. 4A.
Figure 4C:
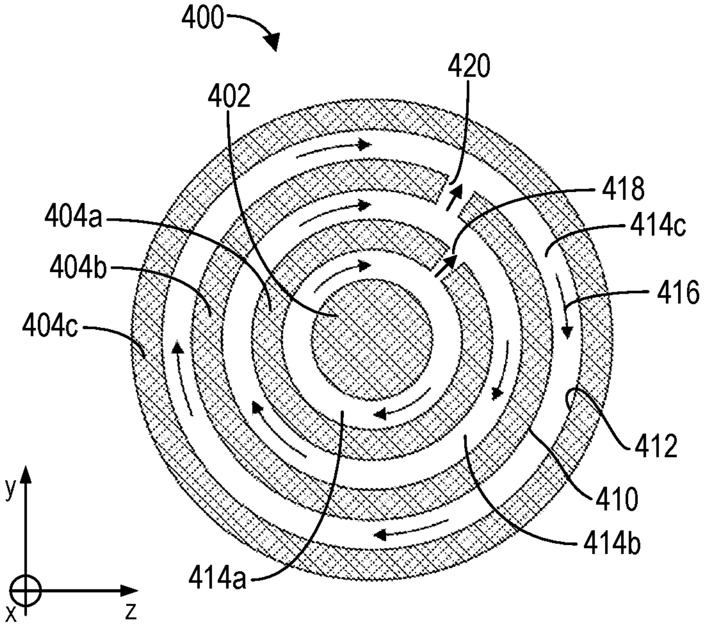
FIG. 4C is a cross-sectional view of the ion manipulation device of FIGS. 4A-4B.

FIGS. 4A-4C depict a curved ion manipulation device 400 according to another example. The device 400 can include three or more cylindrical structures 402, 404*a*-404*c*, each constructed of a respective substrate 402A, 404A-404C. The device 400 can include a first inner structure 402 and a series of outer structures 404*a*-404*c* encircling the inner structure 402. The inner and outer structures 402, 404*a*-404*c* can be concentrically aligned and extend in a longitudinal direction from a first end 406 of the device 400 to a second end 408 of the device 400 (e.g., in the +/−X directions). The inner and outer structures 402, 404*a*-404*c* can define pairs of opposed curved surfaces 422*a*-422*d* that are positioned along a radius R4 of the device 400 such that the pairs of opposed curved surfaces 410, 412 are arranged in series about a common longitudinal axis A4. The radius of the opposed curved surfaces 422*a*-422*d* can increase and decrease with increasing and decreasing distance between the curved surfaces 422*a*-422*d* and the common axis A4.

Each pair of opposed curved surfaces 422*a*-422*d* can include a first curved surface 410 and a second curved surface 412 adjacent and opposed to the first curved surface 410. For example, the inner structure 402 can define a central portion of the device 400 and include a respective first curved surface 410 facing radially outwardly and away from the longitudinal axis A4. Each outer structure 404*a*-404*c* of the device 400 can also include a respective first surface 410 and a second radially inwardly facing surface 412 facing radially inwardly toward the longitudinal axis A4 and respective first surface 410.

Extending between each pair of opposed curved surfaces 422*a*-422*d* is defined a radial gap 414*a*-414*c* (FIG. 4C). Each radial gap 414*a*-414*c* can be defined by a space between a first surface 410 of one structure 402, 404*a*-404*c* and a second surface 412 of the adjacent structure 404*a*-404*c* (e.g., the first surface 410 of structure 404*b* and second surface 412 of structure 404*c*). As described herein, at least a first electrode arrangement can be patterned along the first curved surface 410 on one side of the radial gap 414 and at least a second electrode arrangement opposing the first electrode arrangement can be patterned along the opposed curved surface 412 across the radial gap 414 (e.g., similar to electrode arrangements 311, 313). The first and second electrode arrangements define an ion pathway 415 that extends through a at least a portion of a radial gap 414*a*-414*c*. In various examples, the first and second electrode arrangements can be similar to one another across a respective radial gap 414*a*-414*c*, such that the first and second electrode arrangements mirror each other or provide one-to-one correspondence. In representative implementations, the distance across each radial gap 414*a*-414*c* and between opposed curved surfaces 422*a*-422*c* can have the same or nearly the same value S4 for consistent ion confinement throughout the device 400.

The configuration of the first and second electrode arrangements that define the ion pathways 415 of the radial gaps 414*a*-414*c* can be the same along each radial gap 414*a*-414 of the device 400, or can be different along two or more radial gaps 414*a*-414*c*. In particular, in one implementation, each radial gap 414*a*-414*c* of the device 400 can have the same opposing electrode arrangement and defined ion pathway 415 configuration, while in a second implementation, two or more radial gaps 414*a*-414*c* can have different opposing electrode arrangements and defined ion pathway 415 configurations. In one electrode arrangement, ion pathways 415 can be defined by linear and/or nonlinear segments of opposing electrode arrangements (e.g., FIGS. 6A-7B and 9). The first and second electrode arrangements defining the ion pathway 415 of one or more radial gaps 414*a*-414*c*, for instance, can have longitudinal segments extending in the +/−X directions parallel to the common axis A4 and circumferential segments that follow the curvature of the radial gap 414*a*-414*c* and respective first and second curved surfaces 410, 412 (e.g., within a YZ plane of the device 400). In another electrode arrangement, the opposing electrode arrangements defining the ion pathways 415 of one or more of the radial gaps 414*a*-414*c* can be defined by a helical or coiled electrode pattern (e.g., FIG. 8). The first and second electrode arrangements, for example, can define a helical ion pathway 415 that extends circumferentially about a respective structure 402, 404*a*-404*c* and the common axis A4, in both the +/−YZ directions and the length of the device 400 in the +X or −X direction.

Figure 10A:
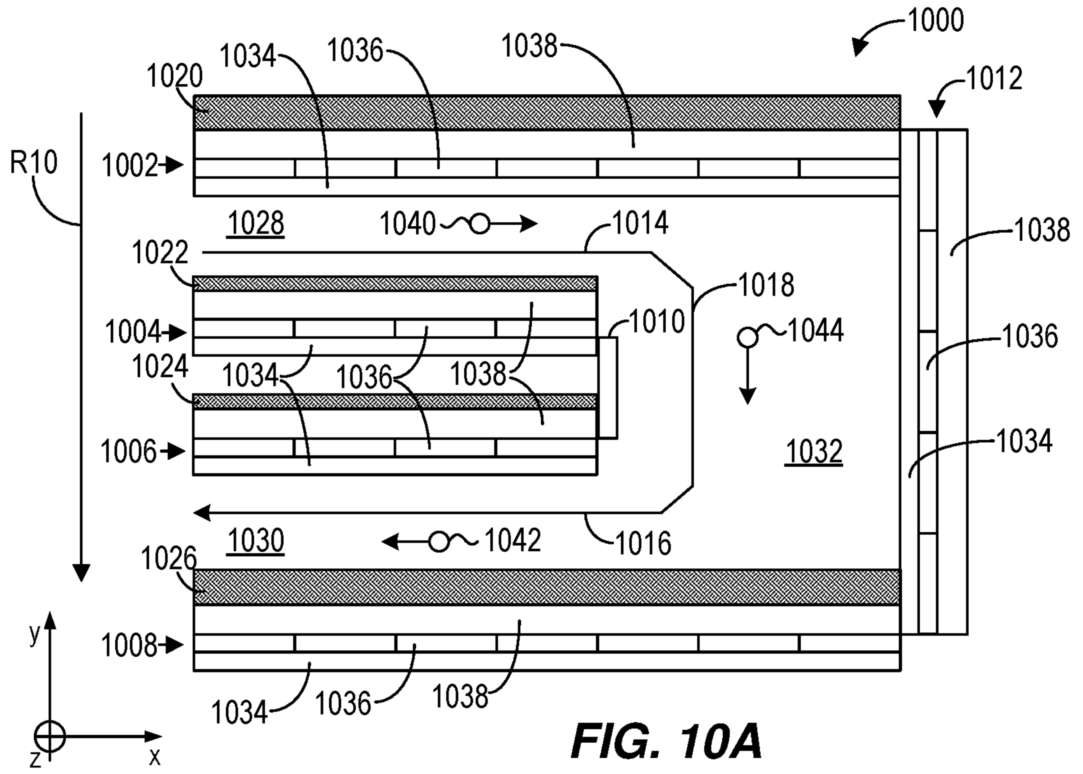
FIGS. 10A-10B are schematic views of an example ion escalator of an ion manipulation device.
Figure 10B:
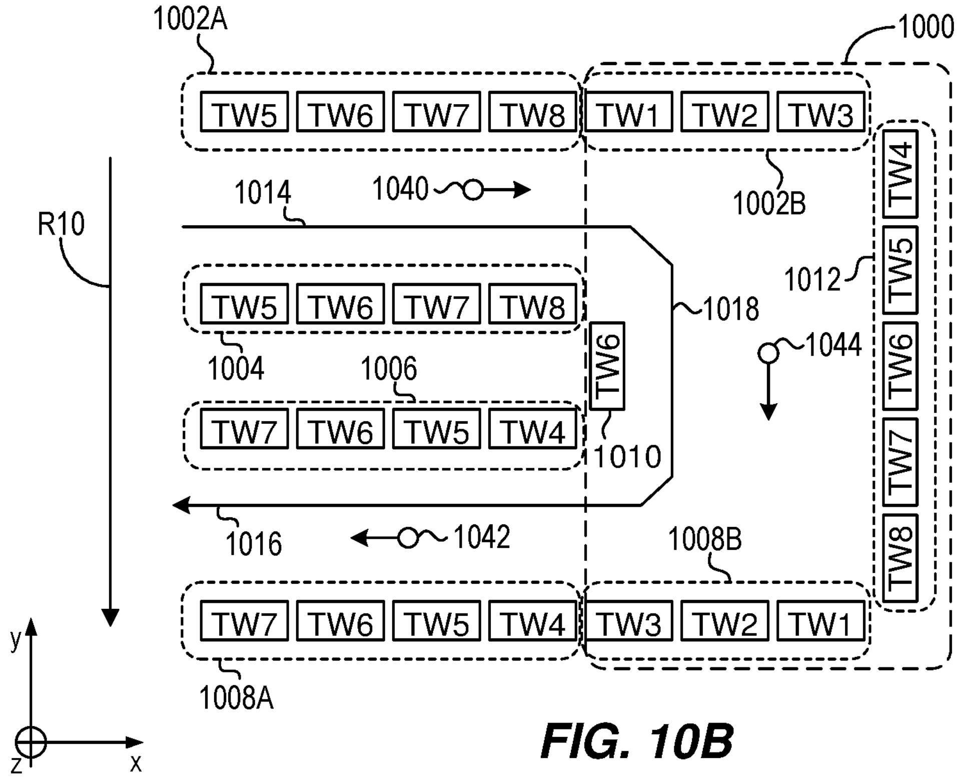

In comparison to the coiled shape of the ion manipulation device 100 and device 200, in which ions travel through a continuous radial gap and a series of opposed curved surfaces, ions directed through the device 400 can move between the radial gaps 414*a*-414*c* and opposing electrode arrangements via one or more ion escalators (FIGS. 10A-10B). Ion escalators of the device 400 are indicated at labels 418, 420 of FIG. 4C, which depicts a cross-section of the device 400 taken along a YZ plane. Each ion escalator 418, 420 can have a curved geometry within the YZ plane and be defined by an opening that extends through a respective outer structure 404*a*-404*c* of the device 400, from one radial gap 414*a*-414*c* to the next adjacent radial gap 414*a*-414*c*. Each ion escalator 418, 420 can have at least a pair of opposing electrode arrangements configured and arranged to direct ions from one ion pathway 415 of one radial gap 414*a*-414*c* to another ion pathway 415 of an adjacent radial gap 414*a*-414*c*. In the illustrative example of FIG. 4C, for instance, ions can be introduced into the inner most radial gap 414*a* proximate the inner structure 402 and directed to the adjacent radial gap 414*b* via the ion escalator 418. In the same way, ions can be directed from the radial gap 414*b* to the adjacent radial gap 414*c* through the ion escalator 420. Ions in this way can be directed through a series of two or more radial gaps 414*a*-414*c* (e.g., as indicated by arrows 416) radially outwardly and away from the common axis A4 to the outer most radial gap 414*c*. Inversely, ions can be directed through a series of two or more radial gaps 414*a*-414*c* via the escalators 418, 420 radially inwardly toward the common axis A4 to the inner most radial gap 414*a*.

An ion escalator 418, 420 described herein can extend between each radial gap 414*a*-414*c* and respective ion pathway 415, or between selected nonadjacent radial gaps 414*a*-414*c* and ion pathways 415, depending on a desired configuration. In some implementations, in addition to directing ions between adjacent radial gaps 414*a*-414*c*, two or more ion escalators can form a chain of escalators, in which ions can be directed from one radial gap 414*a*-414*c* to another nonadjacent radial gap. As one example, the ion escalators 418, 420 of device 400 can be aligned and form an escalator chain in which ions in the outer most radial gap 414*c* of the device 400 can travel directly to the inner most radial gap 414*a*. This, among other things, allows the device 400 to be configured to recirculate ions through one or more selected radial gaps 414*a*-414*c* or the entire device 400, more than once, as desired. In some implementations, the ions need not be circulated or recirculated between the inner and outer most radial gaps 414*a*, 414*c* of a device 400, but can be circulated or recirculated through any two or more radial gaps 414*a*-414*c* positioned between the inner and outer most radial gaps.

As shown in FIGS. 4A-4C and indicated by arrows 416, as ions are directed along the ion pathway 415 of one or more radial gaps 414*a*-414*c*, the ions can follow an overall circumferential path. While the overall circumferential path 416 is illustrated as being directed in a clockwise direction, it should be appreciated that the overall path can be directed in a counterclockwise direction as well. The ion path need not also follow the same direction along each of the radial gaps 414*a*-414*c*. For instance, ions introduced at the inner most radial gap 414*a* can travel in an overall circumferential path 416 in a clockwise direction, but then directed to the next adjacent radial gap 414*b* in which the ions travel in an overall circumferential path 416 in the counterclockwise direction. The direction of the overall circumferential path 416 of each pair of adjacent curved surfaces 410, 412 and radial gaps 414 can be dictated by the configuration of the respective first and second electrode arrangements which define the respective ion pathways.

Ions can be introduced and exit the device 400 via one or more ion inlets and outlets located at and/or anywhere along a respective radial gap 414*a*-414*c* to couple ions to or from the device 400. Ions can be introduced into the device 400 from another device, for example, such as from an ion injector, ion trap, or other ion manipulation device, and can exit the device 400 to be received by another device, such as a mass spectrometer, an ion analyzer, and/or another ion manipulation device. Ion inlets and outlets can be located at any desired and suitable location at the first end 406 or the second end 408 of the device 400.

The substrates 402A, 404A-C that form the inner and outer structures 402, 404*a*-404*c* of the ion manipulation device 400 can be constructed of a flexible or semiflexible substrate material layer or set of layers as described herein, such as a flexible printed circuit board. Each of the outer structures 404*a*-404*c*, for example, can be fashioned from a single substrate which is curved or otherwise shaped into the tube-like cylindrical structure that defines respective first and second curved surfaces 410, 412 as shown in FIGS. 4A-4C. The inner structure 402 can be fashioned from a solid or hollow substrate which extends coaxially through the proximate most outer structure 404*a* and forms a respective first curved surface 410. Pairs of adjacent structures 402, 404*a*-404*c* can be shaped in such a way as to form corresponding opposing adjacent first and second electrode arrangements that are similar to one another and define an ion pathway to direct ions along the radial gaps 414*a*-414*c*

(e.g., in a mirrored configuration or in one-to-one correspondence). In some implementations, the inner structure 402 can be fashioned into a tube-like cylindrical structure similar to that of the outer structures 404*a*-404*c*. In such implementations, the inner structure 402 can have another ion manipulation device, such as a drift tube, coaxially aligned with and extending through volume defined by the inner structure 402 (e.g., FIG. 9). Additionally or alternatively, in some implementations, the device 400, or portions of the device, can be constructed layer-by-layer, such as by an additive manufacturing process. In such implementations, the electrode arrangements and other features of the device can be embedded within the structures 402, 404*a*-404*c*.

Although shown as comprising four structures and three radial gaps defined by respective pairs of opposed curved surfaces, it will be appreciated that the device 400 can include any number of desired structures and respective curved surfaces and radial gaps. The device 400, for example, can include three concentric structures having two radial gaps and respective pairs of opposed curved surfaces, while in other examples, the device 400 can have five or more structures and four or more radial gaps and respective pairs of opposed curved surfaces. The device 400 can have any radius R4 as desired.

It will be appreciated that, although the ion manipulation devices 100-400 are described and depicted herein as being circular and cylindrical in shape, ion manipulation devices can take different forms. Any of the ion manipulation devices, for example, can generally be shaped as oblique cylinders or elliptic cylinders, or other geometric shapes (e.g., rectangular, hexagonal, etc.).

Figure 5A:
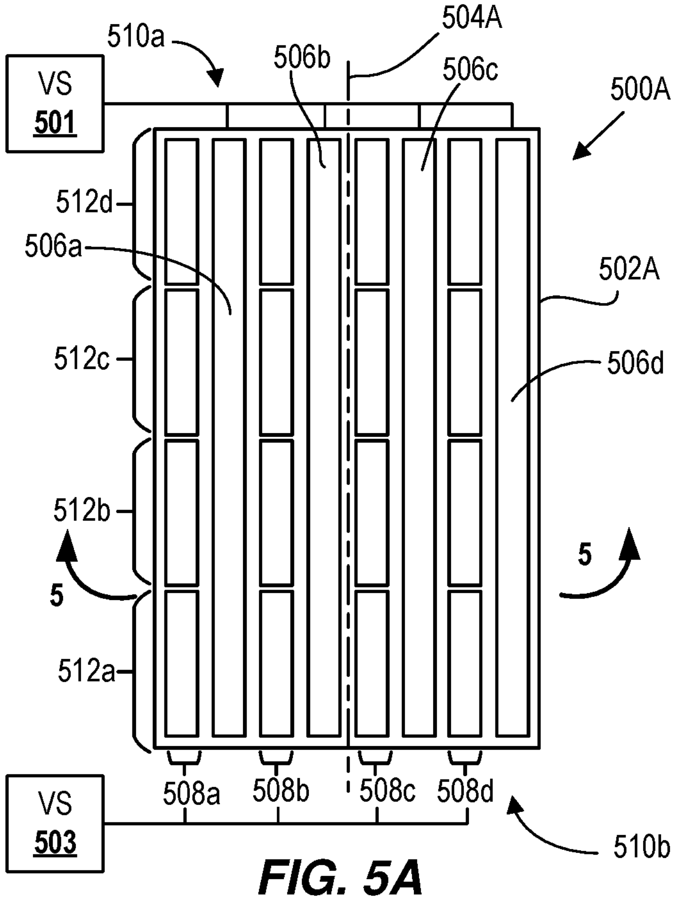
FIGS. 5A-5C are plan views of different electrode arrangements which can be employed in the ion manipulation devices described.
Figure 5B:
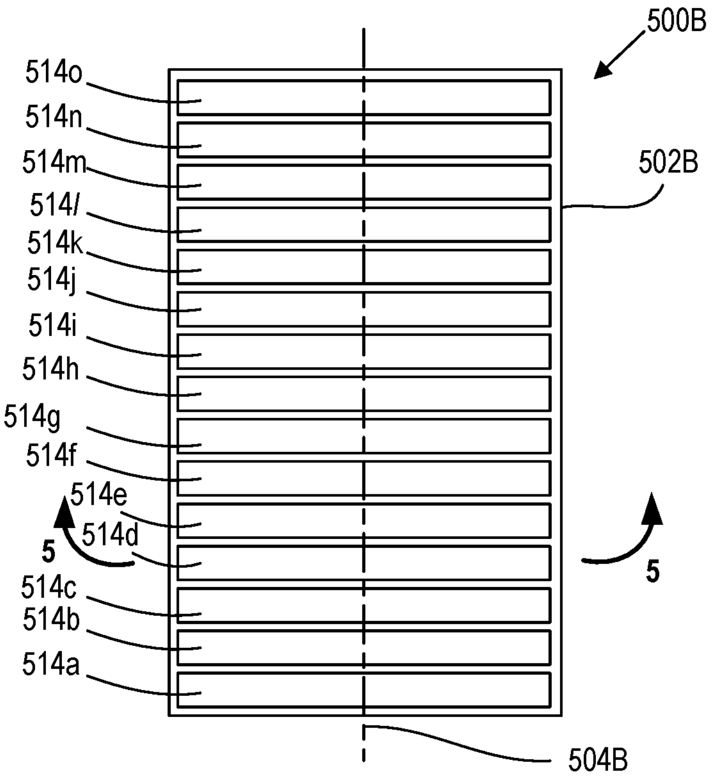
Figure 5C:
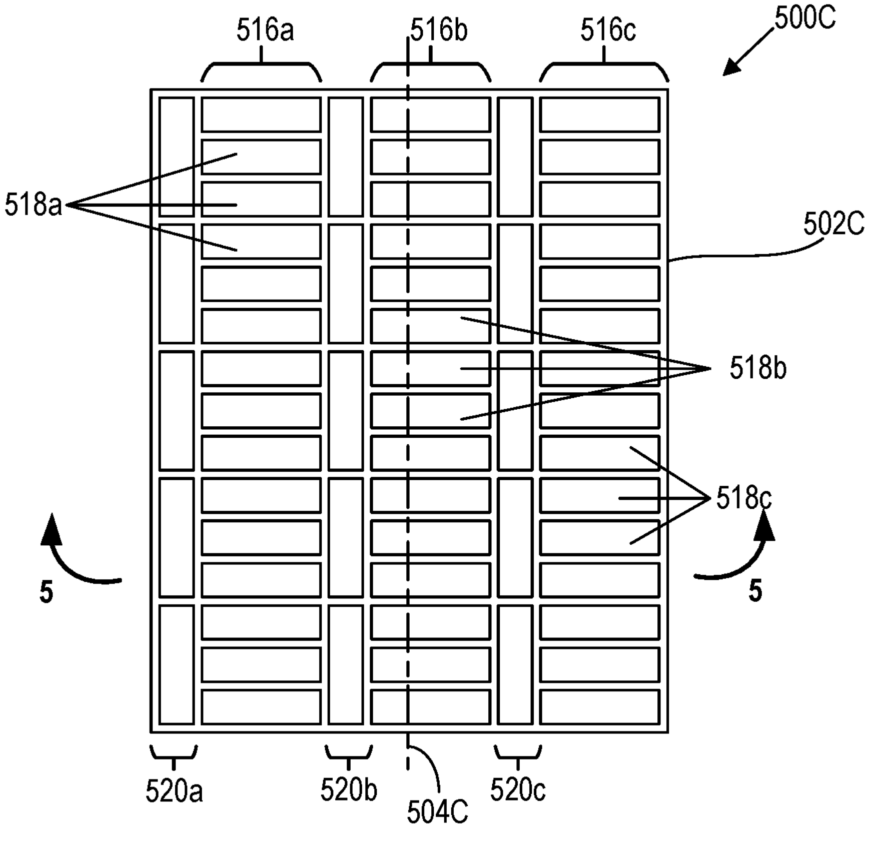

FIGS. 5A-5C are representative electrode arrangements 500A-500C patterned along respective substrates 502A-502C, each substrate 502A-502C of which can be a substrate fashioned into the ions manipulation devices 100-400 described herein. For the purpose of illustration, each electrode arrangement 500A-500C and substrate 502A-502C is show in a flat configuration. However, it should be understood that each electrode arrangement 500A-500C and substrate 502A-502C, when implemented within an ion manipulation device described, can be curved along and form a respective curved surface (e.g., FIGS. 1A-4C and 6A-7B). In each of the illustrated examples of FIGS. 5A-5C, the curvature and/or fashioning of the substrates 502A-502C and electrode arrangements 500A-500C is generally indicated by the arrows 5. It should be appreciated that each electrode arrangement 500A-500C can be one of a pair of opposing electrode arrangements used to define respective ion pathways.

As shown in FIG. 5A, the electrode arrangement 500A can include a plurality of RF electrodes 506*a*-506*d* that extend along the propagation axis 504A and between input and output ends 510*a*, 510*b*. The RF electrodes 506*a*-506*d* typically receive RF voltages alternately or adjacently out of phase. For instance, in the configuration shown in FIG. 5A, the RF electrodes 506*a*, 506*c* can be in phase with each other and 180 degrees out of phase with adjacent RF electrodes 506*b*, 506*d*. The electrode arrangement 500A can also include a plurality of traveling wave electrode sets 508*a*-508*d* that extend parallel to the propagation axis 504A and are situated adjacent and in between the RF electrodes 506*a*-506*d*. Each traveling wave set 508*a*-508*d* can include respective traveling wave electrodes 512*a*-512*d* that are configured to receive corresponding time-varying DC voltages or phase-shifted AC voltages to form a traveling wave that directs (e.g., separates) ions along the ion propagation axis 504A.

A voltage source 501 coupled to the electrodes 506*a*-506*d* can be configured to supply the RF electrodes 506*a*-506*d* with the RF potentials. In this way, the RF electrodes 506*a*-506*d* can confine ions between a pair of opposed electrode arrangements 500A which define an ion pathway. Each traveling wave set 508*a*-508*d* can be coupled to DC voltage source 503 to receive a dynamically applied DC traveling wave voltage that produces a traveling wave electric field (i.e., traveling waves) within the confinement volume between the pair of opposing electrode arrangements 500A defining the ion pathway. In some implementations, dynamically applied DC traveling wave voltages can be applied differently along different segments of an ion manipulation device to produce different ion manipulations. The traveling waves can vary with time and produce a movement, net movement, separation, trapping, accumulation, peak compression, directional change, and/or other manipulations of ions within a confinement volume based on ion characteristics, such as ion mobility or polarity. Traveling wave voltages can also be applied such that similar voltages are applied to traveling wave electrodes of a pair of opposed electrode arrangements, though other dissimilar or altered configurations can be used, including in bends, escalators, switches, etc.

Turning now to FIG. 5B, the electrode arrangement 500B can include a plurality of laterally extending RF electrodes 514*a*-514*o* arranged in a column-like configuration which tracks the ion propagation axis 504B. Adjacent RF electrodes 514*a*-514*o* can be in opposite phase of one another such that the RF electrodes 514*a*-514*o* can direct ions away from the substrate 502B for ion confinement. In some implementations, selected ones of the RF electrodes can be configured as a traveling wave electrode set to receive a time-varying DC voltage that directs ions along the ion propagation axis 504B. For instance, the electrodes 514*c*, 514*f*, 514*i*, 514*l*, 514*o* can constitute the traveling wave electrode set. In such implementations, traveling waves produced by the traveling wave electrode set are superimposed over the RF potentials to effectuate ion manipulation and ion confinement.

The electrode arrangement 500C of FIG. 5C can include a plurality of RF electrode columns 516-516*c*. Each RF electrode column 516-516*c* can include a plurality of respective RF electrodes 518*a*-518*c* and interposed traveling electrode sets 520*a*-520*c*. The RF electrode columns 516-516*c* and traveling wave electrode sets 520*a*-520*c* can extend parallel to the ion propagation axis 506E (e.g., while RF electrodes 518*a*-518*c* are perpendicular). In some configurations, adjacent electrodes 518*a*-518*c* of the RF electrode columns 516-516*c* can be in opposite phase with one another. In other configurations, the laterally adjacent electrodes 518*a*-518*c* in one or more selected rows can have an opposite phase.

The RF voltages received by the electrodes can vary, for instance, with respect to frequency and amplitude, over time, or between adjacent electrodes. Traveling wave characteristics, such as wave speed or amplitude, can also be varied between different traveling electrode arrangements. A control device, such as a computer, controller, etc. can be coupled to or part of any of the voltage sources to control electric potentials applied to the various electrodes, including for ion escalators, switches, DC and/or RIP confinement potentials, and traveling wave sequencing, direction, amplitude, frequency, etc. Typically, a processor can execute computer readable instructions, stored in memory, to carry out the control of electrode potentials within the ion manipulation devices.

In some implementations, each of the electrode arrangements 500A-500E can be situated between guard electrodes (e.g., guard electrodes 1038 of FIG. 10A). Guard electrodes can be driven with a relatively high voltage in comparison to the voltages applied to the RF and/or DC electrodes so that ions drifting transversely or orthogonal to an ion propagation axis are confined ions within a given ion pathway. Further details and descriptions of electrode arrangements are described, for example, in U.S. Pat. No. 10,460,920, which is incorporated herein by reference in its entirety. In further implementations, the RF and/or traveling wave electrodes of the electrode arrangements 500A-500C can be axially and laterally spaced from one another such that electrodes do not contact one another or short when a respective substrate 502A-502C is curved or otherwise shaped into a non-flat configuration (e.g., in three dimensions).

Figure 6A:
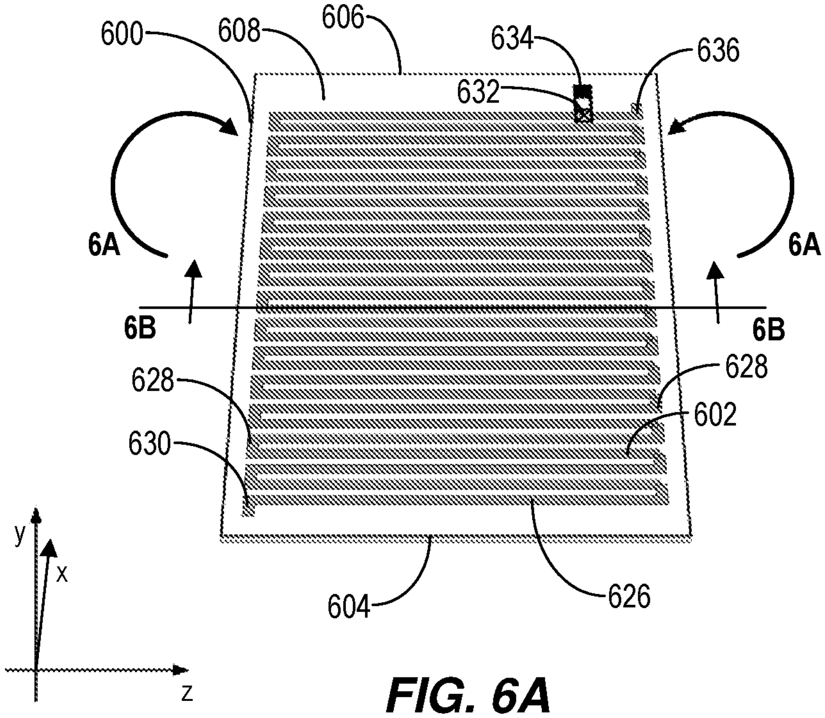
FIG. 6A is a perspective view of a substrate and electrode arrangement according to one example.

FIGS. 6A and 7A depict representative examples of substrates 600, 700 which can be used in the construction of the ion manipulation devices 100-400 described herein. The substrates 600, 700 are shown in a flattened or planar state and can be individual or one of a pair of substrates which are then coiled, rolled, or otherwise fashioned into the coiled shapes of device 100 or device 200, respectively. The substrates 600, 700 can also be fashioned, such as by being curved, folded, or otherwise shaped into any one of the structures of the device 300 or device 400. This fashioning of the substrates 600, 700 is indicated by arrows 6A and arrows 7A, respectively.

Each substrate 600, 700 can include a respective electrode arrangement that when paired with an opposing electrode arrangement can define an ion pathway. As shown in both FIGS. 6A and 7A, each electrode arrangement 602, 702 can be patterned, printed, and/or embedded along a surface 608, 708 of a respective substrate 600, 700. The electrode arrangements 602, 702 can extend along at least a portion of the substrate surfaces 608, 708 between respective first ends 604, 704 and second ends 606, 706 and have a similar serpentine arrangement. Each electrode arrangement 602, 702, for example, can include a plurality of extended segments 626, 726 and bended segments 628, 728 within the serpentine arrangements. As shown in FIG. 6A, the extended segments 626 of the electrode arrangement 602 can extend in the +/−Z directions and have a first length relatively longer than the bended segments 628 which can be arranged to link the extended segments 626 to one another to define a continuous patterned electrode path. The bended segments 628 can extend in the +/−X direction and by extension, can have a relatively shorter length than the extended segments 626. In comparison, the electrode arrangement 702 can have a different orientation. In particular, as illustrated in FIG. 7A, the extended segments 726 of the electrode arrangement 702 can extend in the +/−X direction, while the bended segments 728 can link together the extended segments 726 and extend in the +/−Z directions. As will be further described, the extended segments 626, 726 and bended segments 628, 728 can correspond to the circumferential and longitudinal segments of the ion pathways extending along one or more radial gaps of the ion manipulations devices.

As depicted in FIGS. 6A and 7A, ion inlets 630, 730 of the electrode arrangements 602, 702 can be located at respective first ends 604, 704 of the substrates 600, 700. The inlets 630, 730 can be a location at which ions are first introduced into the ion manipulation device and/or where ions enter into after traveling through an ion escalator from another connected ion pathway and radial gap (e.g., FIGS. 4C and 10A-10B). Located at respective second ends 606, 706, can be one or more switches 632, 732, ion escalators 634, 734, and/or ion outlets 636, 736. A switch 632, 732 can include a respective electrode arrangement configured (e.g., using DC voltages) to direct ions to the ion escalator 634, 734 where ions can be directed to an adjacent or another radial gap and pair of electrode arrangements for circulation or recirculation. The switches 632, 732 can alternatively direct ions to the outlets 636, 736 such that the ions exit the ion manipulation device, such as to another device for analysis or further manipulation. In some implementations, a switch 632, 732 can have operational states, such as a first state and second state, which can be controlled via suitable electric potentials to route the ions to the ion escalators 634, 734 or outlets 636, 736 as desired. In other implementations, the switches 632, 732 can be used for ion trapping or ion accumulation, such as by accumulating ions at the switches 632, 732 during some time interval. It should also be appreciated that in certain implementations, the ion escalators 634, 734 need not be included. For instance, in the coiled shapes of ion manipulation devices 100-200, or the single pair of structures of the device 300, an ion escalator may not be desired. It will also be understood that in order to suit various configurations, the inlets, outlets, ion escalators, and switches can be located at different segments, ends, or other portions of the of the electrode arrangements 602, 702 than those described.

Figure 6B:
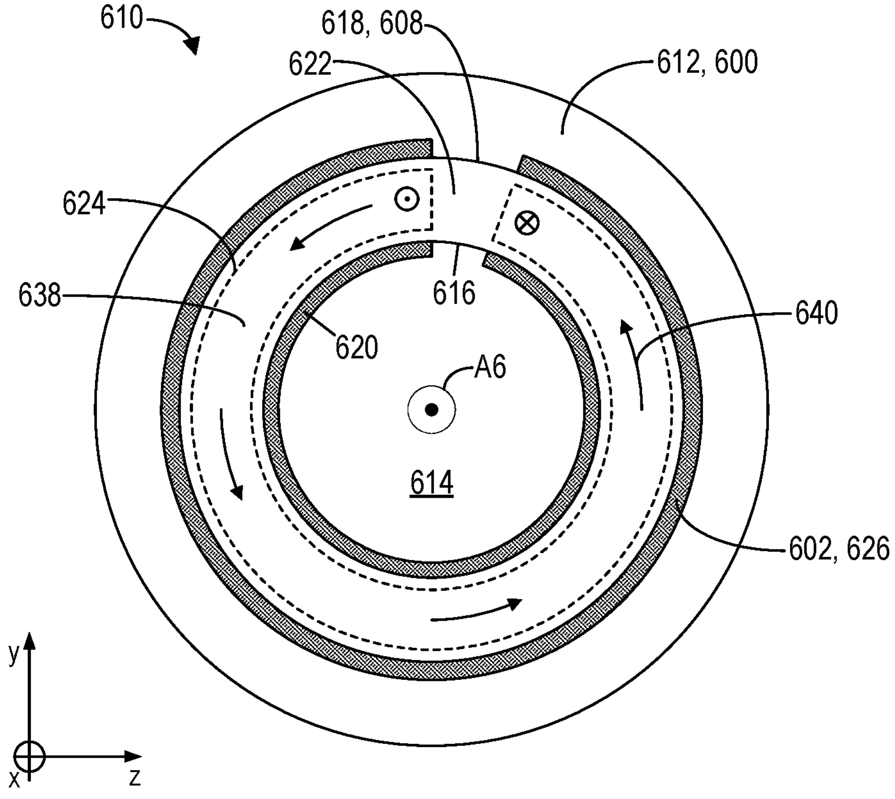
FIG. 6B is an elevated view of an ion manipulation device comprising the substrate and electrode arrangement of FIG. 6A.

Each electrode arrangement 602, 702 can serve as one electrode arrangement in a pair of opposed electrode arrangements defining an ion pathway. FIGS. 6B and 7B, for example, show each substrate 600, 700 after being fashioned into an outer structure 612, 712 of a respective ion manipulation device 610, 710. The ion manipulation devices 610, 710 can have the same general arrangement as the ion manipulation device 300 or ion manipulation device 400. In particular, as shown in the illustrated examples, the substrates 600, 700 are fashioned into outer structures 612, 712 of respective ion manipulation devices 610, 710 that encircle and are coaxially aligned with inner structures 614, 714 along a common longitudinal axis A6, A7 (the inner structures 614, 714 are not shown in FIGS. 7A, 7B). In this configuration, the inner structures 614, 714 define first curved surfaces 616, 716 facing radially outwardly from respective common axes A6, A7, while the surfaces 608, 708 of the substrates 600, 700 define second curved surface 618, 718 opposed to the first curved surfaces 616, 716 and facing radially inwardly toward the common axes A6, A7. Extending between each pair of opposed curved surfaces 616, 618 and curved surfaces 716, 718 is defined a respective radial gap 622, 722. The inner structures 614, 714 can also include respective first electrode arrangements 620, 720 patterned along the first curved surfaces 616, 716 on one side of the radial gap 622, 722 in a serpentine arrangement that correspond with the second electrode arrangements 602, 702 patterned along the second surface 618, 718 of the substrates 600, 700 and across the radial gaps 622, 722. In this way, the electrode arrangements 620, 720 of the inner structures 614, 714 can be radially aligned and opposed to the electrode arrangements 602, 702 such that the electrode arrangements 620, 602 and electrode arrangements 720, 702 are respectively similar to one another and can define ion pathways 624, 724 that extend through respective radial gaps 622, 722 and devices 610, 710 (e.g., in a mirrored configuration or in one-to-one correspondence). Accordingly, as shown in FIGS. 6B and 7B, the extended segments 626, 726 and bended segments 628, 728 reflected in the serpentine arrangement of the electrode arrangements 602, 702 define circumferential segments and longitudinal segments (e.g., opposed electrodes arrangements 912, 914 of FIG. 9) of the ion pathways 624, 724 extending through the radial gaps 622, 722 and curved surfaces. It should be appreciated that, in some examples, an electrode arrangement patterned along one curved surface can differ slightly in scale from an opposing electrode arrangement of an opposed curved surface. For instance, an electrode arrangement patterned along an inner curved surface can be slightly smaller in scale from the opposing electrode arrangement patterned along a corresponding outer curved surface, which has a relatively greater radius than the inner curved surface. The difference in scale, such as the size and shape of the electrode arrangements, can account for the difference in radius across a respective radial gap and pair of opposing curved surfaces to ensure that pairs of opposing electrode arrangements define a desired ion pathway.

FIG. 6B depicts a cross-section of the ion manipulation device 610 after being rolled but taken along the YZ plane of the substrate 600 shown in FIG. 6A. FIG. 6A shows that the plane 6B is taken along an extended segment 628 of the electrode arrangement 602 and is the portion of the electrode arrangement 602 illustrated in FIG. 6B. As shown in FIG. 6B, the extended segment 626 of the electrode arrangement 602 and electrode arrangement 620 of the inner structure 614 define a circumferential segment 638 of the ion pathway 624 that follows the curvature of the first and second curved surfaces 616, 618 (or surface 608) and radial gap 622 within the YZ plane of the device 610. As illustrated in FIG. 6B, ions can follow an axis of propagation 640 circumferentially in a counterclockwise direction along the circumferential segments 638. In this configuration, as the ions reach the upper most end of the circumferential segment 638, the ions are directed in the +/−X direction into the plane of FIG. 6B as it travels through a respective bended segment 628 to the next extended segment 626 and so forth until reaching an ion escalator 634 or outlet 636. As ions travel through the next adjacent extended segment 626 the ions can move in a circumferentially path in the clockwise direction. Accordingly, the ions can be said to follow an overall circumferential path through the ion manipulation device 610 and extended segments 626. In some implementations, ions move in both clockwise and counterclockwise directions in an alternating fashion as ions travel along two or more radial gaps.

Similarly, FIG. 7B depicts a cross-section of the ion manipulation device 710 taken along a plane 7B extending in the YZ directions of the substrate 700. As shown in FIG. 7A, the plane 7B extends across a series of bended segments 728 of the electrode arrangement 702 proximate the first end 704 of the substrate 700. FIG. 7B shows that the series of bended segments 728 of the electrode arrangement 702 and electrode arrangement 720 define a corresponding number of circumferential segments 738 that track the curvature of the first and second curved surfaces 716, 718 (or surface 708) and radial gap 722. Ions directed through these circumferential segments 738 can follow an axis of propagation 740 through each segment in a counterclockwise (or clockwise) direction. In between each circumferential segment 738 is a pair of longitudinal segments of the ion pathway 724 extending in the +/−X direction of the device 710 (e.g., in and out of the plane of FIG. 7B). An example of a longitudinal segment is shown in FIG. 9 and is defined by the opposing electrode arrangements 912, 914. At the opposing end of the device 710, e.g., the second end 706 of the substrate 700, another series of bended segments 728 define another corresponding number of circumferential segments 738. Ions can move through the curved surfaces 716, 718 and radial gap 722 and in and out of the circumferential segments 738 and longitudinal segments of the device 710 until reaching an ion escalator 734 or outlet 736.

Although described herein as having a serpentine arrangement, it should be appreciated that the electrode arrangements 602, 702 can have any configuration or arrangement in accordance with the present disclosure.

FIG. 8 illustrates a segment of an ion manipulation device 800 having one or more helical ion pathways 802 extending along the device. The device 800 can have a similar configuration as the ion manipulation device 300 or ion manipulation device 400 and include any one or combination of features described above in connection with FIGS. 3A-4C, The ion manipulation device 800, can include a series of cylindrical structures, such as a first inner structure 804 and a second outer structure 806, which are coaxially aligned along a common longitudinal axis A8. The inner and outer structures 804, 806 can define a respective pair of adjacent curved surfaces 808, 810 opposing one another and spaced apart to define a radial gap 812. The curved surfaces 808, 810 and the radial gap 812 can be arranged radially about the common axis A8. The curved surface 808 of the inner structure. 804 can be facing radially outwardly away from the common axis A8 and include a first electrode arrangement 814. In a similar fashion, the curved surface 810 of the outer structure 806 can be a radially inwardly facing surface facing toward the common axis A8 and include a second electrode arrangement 816 opposed to the first electrode arrangement 814. For purposes of illustration, in order to illustrate the helical ion pathway 802, FIG. 8 shows a partial cross-section taken along an XY plane of the ion manipulation device 800 through the outer structure 806 and first and second electrode arrangements 814, 816. The first and second electrode arrangements 814, 816 are also shown schematically. It should be appreciated that first and second electrode arrangements 814, 816 of the device 800 can comprise any one or combination of electrode arrangements described in connection with FIGS. 5A-5E for ion confinement and manipulation.

As shown in FIG. 8, the first and second electrode arrangements 814, 816 can be similar to one another and define a helical ion pathway 802 that extends along the radial gap 812 and along the device 800. The first and second electrode arrangements 814, 816 can be configured for longitudinal and transverse ion confinement to direct and manipulate ions along the helical pathway 802, such as for ion mobility separations or ion trapping. The helical pathway 802 is depicted by the outer transverse boundaries (e.g., orthogonal) defined by the electric potentials applied to the first and second electrode arrangements 814, 816. Ions can generally travel along an ion propagation axis 818. As ions are directed through the radial gap 812 and helical pathway 802, the ions can follow an overall circumferential ion path (e.g., FIGS. 3A-4C), circumferentially about the inner structure 804 and the common axis A8 in both the +/−YZ directions, while moving along the length of the device 800 in the +X or −X direction. As mentioned in connection with FIGS. 4A-4C, multiple helical pathways can be included throughout the ion manipulation devices described herein, each along a respective radial gap. In the example shown in FIG. 8, for instance, once ions travel through the helical pathway 802, from one end 820 of the device 800 to another end 822 of the device in the +X direction, the ions can be directed via one or more ion escalators to another radial gap, adjacent or nonadjacent, which can include a respective helical ion pathway. In this case, the helical pathway of the second radial gap can travel in the −X direction, from one end 822 to the other end 820 of the device. A third helical ion pathway in this sequence can again travel in the +X direction. In some implementations, one or more helical pathways 802 can be arranged and combined with one or more ion pathways having longitudinal and circumferential segments (FIGS. 6A-7B). Rather than using electrodes to form electric barriers to push ions down the length of a device or virtually extend the ion pathway, the ion manipulation device 800 is configured to direct ions through and along a realized helical ion pathway 802, which advantageously extends the physical length of ion pathways that other applications cannot achieve for ion mobility manipulations.

FIG. 9 shows a segment of another ion manipulation device 900. The device 900 can have a similar configuration as the ion manipulation device 300, device 400, device 610, device 710, or device 800, and can include any one or combination of features described above in connection with FIGS. 3A-4C and FIGS. 6A-8.

FIG. 9, shows a cross-section view of the device 900 taken along an XY plane parallel to a common longitudinal axis A9. The ion manipulation device 900 can include a series of two or more cylindrical structures coaxially aligned with one another along the common axis A9. In the illustrated example of FIG. 9, a first inner structure 902 and a second outer structure 904 encircling the inner structure 902 are shown. The inner and outer structures 902, 904 can define a respective pair of adjacent curved surfaces 906, 908 opposing one another and spaced apart to define a radial gap 910. The curved surface 906 of the inner structure 902 can be a radially outwardly facing surface facing away from the common axis A9, while the curved surface 908 of the outer structure 904 can be a radially inwardly facing surface facing toward the common axis A9. The device 900 can also have opposed first and second electrode arrangements 912, 914 that define an ion pathway having longitudinal and circumferential segments, as opposed to the helical ion pathway 802 of device 800. As shown in FIG. 9, for example, the first and second electrode arrangements 912, 914 extend longitudinally along in the +/−X direction to define a longitudinal segment of the ion pathway. Although not shown, the electrode arrangements 912, 914 can also form circumferential portions (e.g., FIGS. 6B and 7B). In some implementations, the first and second electrode arrangements 912, 914 within the device 900 can define a helical ion pathway (FIG. 8).

A first inner structure 902 of the device 900 can have a tube-like configuration. The inner structure 902, for example, can have a cylindrical configuration similar to the outer structure 904, in which the inner structure 902 has a hollowed tube-like body. Advantageously, in this configuration, extending through the inner structure 902 can be sub-ion manipulation device 916 such that the inner structure 902 encircles the sub-device 916. The sub-ion manipulation device 916 can have a respective electrode arrangement which further includes a plurality of electrodes 918 axially spaced from one another along the common axis A9 and coaxially with the device 900. The sub-device 916 can be configured, for example, as a stacked ring drift tube, although other drift tubes can be used. A voltage source 920 can be coupled to the sub-device 916 and configured to apply a range of voltages to individual electrodes or groups of electrodes 918 such that ions introduced into the sub-device 916 can be directed through the volume of the sub-device 916, from one end 922 to the other end 924. The voltage source 920 can be coupled to the device 916 via wiring or printed circuit board and can be configured to apply linear and/or nonlinear electric fields (e.g., DC electric potentials). As shown in FIG. 9, the voltage source 920 can also be coupled to the device 900, such that the voltage source 920 can supply the electric fields to both device 900 and sub-device 916. In other implementations, the device 900 and sub-device 916 are coupled to separate voltage sources (e.g., voltage sources 501, 517 and voltage source 920, respectively).

Attached to both the device 900 and sub-device 916, e.g., via the voltage source 920, can be a control 926 to control the operation of the devices. The control 926, for instance, can be configured to switch between modalities in which, in one state the device 900 is operational, and in another state the sub-device 916 is operational. In this way, the device 900 and sub-device 916 can be configured to operate separately from one another but co-located within the existing footprint of the device 900, In some implementations, the device 900 and sub-device 916 can operate at the same time, such that the device 900 can manipulate ions in one mode, while the sub-device 916 can manipulate ions in another mode different from the mode of the device 900. The control 926 can typically be a processor, such as a computer or other device, that can execute computer readable instructions, stored in memory, to carry out the control of the electrode potentials and operation of both the device 900 and sub-device 916.

FIGS. 10A-10B illustrate one example of an ion escalator 1000 and corresponding traveling wave patterns that can be used in the ion manipulation devices described herein. For the purpose of illustration and to facilitate discussion of the ion escalator 1000, curved surfaces 1020, 1022, 1024, 1026 and electrode arrangements 1002, 1004, 1006, 1008 of the ion escalator 1000 are shown from a side view and shown schematically. Portions of the ion escalator 1000 that might otherwise obstruct the view of the electrode arrangements and curved surfaces have also been omitted for clarity. FIG. 10A, in particular, is a cutout or segment of a curved ion manipulation device which includes the ion escalator 1000, and a schematic representation of electrode arrangements 1002, 1004 defining an ion pathway 1014, electrode arrangements 1006, 1008 defining an ion pathway 1016, and electrode arrangements 1010, 1012 defining an ion pathway 1018. The ion pathway 1018 couples the ion pathways 1014, 1016 through the ion escalator 1000. FIG. 10B is a schematic representation of the traveling wave electrodes of the different electrode arrangements 1002, 1004, 1006, 1008, 1010, 1012. The traveling wave electrodes can be used to direct ions along the ion pathways 1014, 1016, 1018. The schematic representations of FIGS. 10A-10B show the electrode arrangements 1002, 1004, 1006, 1008 and respective curved surfaces 1020, 1022, 1024, 1026 arranged radially along a radius R10 and Y axis of a device including the ion escalator 1000, and defining ion pathways 1014, 1016, and 1018 extending in the +/−X and −Y directions. In this regard, the ion escalator 1000 can have a curved geometry in the +/−Z directions, similar to that of the curved surfaces 1020, 1022, 1024, 1026.

While shown schematically, it should be appreciated that the electrode arrangements 1002, 1004, 1006, 1008 can be patterned along the curved surfaces 1020, 1022, 1024, 1026 in any arrangement, including those electrode arrangements described herein (e.g., any of the electrode arrangements 500A-500E shown in FIGS. 5A-5E). The electrode arrangements 1002-1012 can, for example, include rows of RF electrodes 1034 and traveling wave electrodes 1036 arranged side-by-side in an alternating fashion (e.g., along a respective curved surface in the Z direction). The electrodes arrangements 1002-1012 can be similar to the electrode arrangement 500C shown in FIG. 5C, for instance. The rows of RF electrodes 1034 and traveling wave electrodes 1036 can be situated between guard electrodes 1038.

As shown in FIGS. 10A-10B, the electrode arrangements 1002, 1004 can be patterned along a first pair of adjacent curved surfaces 1020, 1022 and the electrode arrangements 1006, 1008 can be patterned along a second pair of adjacent curved surfaces 1024, 1026. Between the curved surfaces 1020, 1022 and 1024, 1026 can be defined respective radial gaps 1028, 1030 for ion pathways 1014, 1016. The opposing electrodes arrangements 1002, 1004 and opposing electrode arrangements 1006, 1008, for example, can each define a helical ion pathway or an ion pathway comprising circumferential and longitudinal segments through the respective radial gap 1028, 1030. An escalator region 1032 and escalator pathway 1018 of the ion escalator 1000 can extend to couple the radial gaps 1028, 1030. The escalator region 1032 can be defined by the opposing electrode arrangements 1010, 1012 and electrode arrangements 1002B, 1008B. The electrode arrangements 1002B, 1008B can correspond to portions or extensions of the electrode arrangements 1002, 1008, respectively.

In the illustrated examples of FIGS. 10A-10B, the first radial gap 1028 is shown as an inner radial gap and the second radial gap 1030 is shown as an outer radial gap, such as along a radius R10 of a device. The ion escalator 1000 can extend and be operable to the direct ions from the inner radial gap 1028 to the adjacent outer radial gap 1030 and from ion pathway 1014 to pathway 1016. In this configuration, ions are being directed radially outwardly (e.g., in the YZ plane of the device) from a common axis of the curved surfaces 1022, 1024, 1026, 1028. Ions, for instance, can be directed radially outwardly with electrode arrangements situated at a sequence of two or more pairs of curved surfaces, from an inner section of the ion manipulation device to an outer section of the ion manipulation device (e.g., FIGS. 4A-4C and R4). Although described as directing ions radially outwardly, it should be appreciated that the following description can be applied to directing ions radially inwardly as well (e.g., toward a common axis of the plurality of adjacent surfaces).

Provided with RF electric potentials in alternating polarity or other phasing, the RF electrodes 1034 can provide transverse confinement along the ion pathways 1014, 1016, 1018 via an effective potential resulting from time-varying out-of-phase RF wave forms. The guard electrodes 1038 can be used to also provide a transverse DC potential well for additional transverse confinement. Phased traveling wave electric potentials applied to traveling wave electrodes 1036 can generate a traveling wave propagating along the ion pathway 1014 through the inner radial gap 1028 in the +X direction, along the pathway 1018 through the aperture 1032 in the −Y direction, and along the pathway 1016 through the second radial gap 1030 in the −X direction as the ions emerge from the ion escalator 1000. In this configuration, the ion escalator 1000 can define a "wraparound" ion escalator configuration which facilitates movement of ions between the first and second radial gaps 1028, 1030.

FIG. 10B illustrates an example of the traveling wave potentials for the ion escalator 1000 and ion pathways 1014, 1016, 1018 which can be employed for directing ions between the inner and outer radial gaps 1028, 1030, although other potentials can be used. For the purpose of illustration, only the traveling wave electrodes 1036 are depicted, and each is labeled with a respective phase of traveling wave potential (TW). The label of traveling wave "TW1," for instance, indicates that the corresponding traveling wave electrode has a relative phase of 1. In this way, the TW designation indicates that TW2 has peaks shortly after TW1, TW3 peaks after TW2, and so forth. In the illustrated configuration of FIG. 10B, eight phases of traveling wave potentials are used, corresponding to an approximately 45-degree phase shift between successive phases. It should be appreciated that TW1 follows TW8 and can be considered equivalent to a relative phase of TW9 and so on.

As shown in FIG. 10B, the traveling wave potentials can be applied to the traveling wave electrodes 1002A, 1004A of the electrode arrangements 1002, 1004 as shown so that the electric potential traveling wave 1040 provided by electrodes 1002A, 1004A can direct ions from left-to-right through first radial gap 1028, along the pathway 1014, and toward the ion escalator 1000. In a similar fashion, the traveling wave 1042 provided by the traveling wave electrodes 1006A, 1008A can direct ions from right-to-left such that ions emerging from the bottom or exit of the escalator 1000 travel through the second radial gap 1034) and along the pathway 1016 in the direction.

As mentioned, the escalator pathway 1018 can be defined by the third pair of opposing electrode arrangements 1010, 1012 and corresponding portions of the electrode arrangements 1002B, 1008B. The electrode arrangements 1010, 1012 and traveling wave electrodes arrangements 1002B, 1008B can be phased as indicated to provide a traveling wave 1044 that is generally in continuous phase with the traveling waves 1040, 1042. In some implementations, the amplitude of the traveling wave 1044 can be greater than an amplitude of the other traveling waves 1040, 1042 and can be in a surfing mode to provide better ion confinement and reduce ion losses along the bend of ion pathway 1018 from the first radial gap 1028, through the escalator aperture 1032, and into the second radial gap 1030. Although the phasing of the traveling wave electrodes depicted in FIG. 10B are shown with some particularity, other phases and configurations can be employed. It should be appreciated that the escalator 1000 can be one within a chain of escalators leading back to another nonadjacent radial gap, for example, for recirculation or to limit the overall ion path length for ion manipulation.

It will be appreciated that ion escalators can have different configurations. As one example, an ion escalator can be configured to receive ions from and propagating in opposite directions, such as ions traveling from both the −X and +X directions from axially aligned electrode arrangements within a single radial gap. In such a configuration, opposing traveling wave electrodes and potentials can be phased in much the same way as described in connection with ion escalator 1000, to direct ions from a first radial gap in which the ions are propagating in opposite directions to another pair of adjacent curved surfaces and electrode arrangements. Further details and descriptions of ion escalators are described, for example, in U.S. Pat. No. 11,119,069, which is incorporated herein by reference in its entirety.

GENERAL CONSIDERATIONS

As used in this application and in the claims, the singular forms "a," "an," and "the" include the plural forms unless the context clearly dictates otherwise. Additionally, the term "includes" means "comprises." Further, the term "coupled" or "connected" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present, or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses the terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

Some examples are described in relation to one or more longitudinal and lateral directions generalized to correspond to ion movement or confinement. Directions typically apply to ion movement, trapping, and confinement and are provided by electric fields produced by one or more electrodes that are arranged on inner and opposing surfaces of the layers of the ion manipulation device to define one or more circumferentially and longitudinally extending ion pathways of various shapes, sizes, and configurations. Actual ion movement paths vary and can depend on the various characteristics of the electrode arrangements and electric fields produced by the corresponding electrodes and the positional, polarity, kinetic, or other characteristics of the ions received in a confinement volume. Directions referred to herein are generalized and actual specific particle movements typically correspond to electric fields produced and the electrical mobilities of the ions propagating in relation to the electric fields, as well as gas flow movements in some examples.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instances, various components of systems described herein may be combined in function and use. I therefore claim all that comes within the scope of the appended claims.

The invention claimed is:

1. An ion manipulation device, comprising:

an ion manipulation structure comprising one or more pairs of opposing curved surfaces sharing a common longitudinal axis and radially spaced from one another by a radial gap along a radius of the ion manipulation structure, each pair of opposing curved surfaces comprising a first electrode arrangement and a second electrode arrangement opposed to the first electrode arrangement, wherein the first and second electrode arrangements define an ion pathway through the radial gap and are configured to direct ions along the ion pathway and circumferentially through the radial gap;

wherein the first and second electrode arrangements include respective sets of segmented electrodes arranged along the direction of the ion pathway and configured to receive time-varying voltages that direct the ions along the ion pathway.

2. The device of claim 1, wherein the first electrode arrangement extends along one of the pair of curved surfaces and the second electrode arrangement extends along the other of the pair of curved surfaces.

3. The device of claim 1, wherein the ion pathway has a plurality of circumferentially extending segments and a plurality of longitudinally extending segments.

4. The device of claim 3, wherein the circumferentially extending segments have a first length and the longitudinally extending segments have a second length, the first length being greater than the second length.

5. The device of claim 3, wherein the circumferentially extending segments have a first length and the longitudinally extending segments have a second length, the first length being less than the second length.

6. The device of claim 1, wherein the ion manipulation structure comprises a single coiled structure.

7. The device of claim 1, wherein the ion manipulation structure comprises a pair of coiled structures.

8. The device of claim 1, wherein the ion manipulation structure comprises concentric cylindrical structures.

9. An ion manipulation device, comprising:

a radial series of curved surfaces arranged about a common longitudinal axis, wherein adjacent pairs of the curved surfaces are spaced apart to define respective radial gaps and wherein adjacent pairs of the curved surfaces respectively comprise pairs of opposing electrode arrangements, wherein each pair of opposing electrode arrangements defines a respective ion pathway and is configured to direct ions through the ion pathway and circumferentially through its respective radial gap, and to another one of the radial gaps;

wherein the opposing electrode arrangements include respective sets of segmented electrodes arranged along the direction of the respective ion pathway and configured to receive time-varying voltages that direct the ions through the ion pathway.

10. The device of claim 9, wherein the opposing electrode arrangements of one or more pairs of the adjacent curved surfaces define the ion pathway to have a plurality of circumferentially extending segments and a plurality of longitudinally extending segments.

11. The device of claim 9, wherein the opposing electrode arrangements of one or more pairs of the adjacent curved surfaces define the ion pathway to be a helical ion pathway.

12. The device of claim 9, wherein each pair of adjacent curved surfaces are surfaces of a pair of concentric structures.

13. The device of claim 9, wherein a spacing between the curved surfaces of each of the adjacent pairs of curved surfaces is the same.

14. The device of claim 9, wherein the ion pathways are connected to form a single continuous ion pathway.

15. The device of claim 9, wherein the ion pathways of two radial gaps are coupled to one another by an ion escalator configured to direct ions from one of the radial gaps to the other of radial gap.

16. The device of claim 9, further comprising a drift tube electrode arrangement extending along the common longitudinal axis and configured to direct ions from a first end of the drift tube electrode arrangement to a second end of the drift tube electrode arrangement.

17. The device of claim 16, wherein one or more pairs of the adjacent curved surfaces encircle the drift tube electrode arrangement.

18. A method comprising:

directing ions through one or more pairs of opposing curved surfaces of a curved ion manipulation structure, wherein each pair of opposing curved surfaces are spaced apart radially relative to a common longitudinal axis of the ion manipulation structure to define a radial gap and wherein each pair of opposing curved surfaces comprises a first electrode arrangement and a second electrode arrangement opposed to the first electrode arrangement, wherein the first and second electrode arrangements define an ion pathway and are configured to direct ions along the ion pathway and circumferentially through the radial gaps of the ion manipulation structure;

wherein the first and second electrode arrangements include respective sets of segmented electrodes arranged along the direction of the ion pathway and configured to receive time-varying voltages that direct the ions along the ion pathway.

19. The method of claim 18, wherein the first and second electrode arrangements of one or more of the pairs of opposing curved surfaces define an ion pathway having a plurality of circumferentially extending segments and a plurality of longitudinally extending segments.

20. The method of claim 18, wherein the first and second electrode arrangements of one or more of the pairs of opposing curved surfaces define a helical ion pathway.

21. The method of claim 18, the method further comprising directing ions through a drift tube electrode arrangement extending along the common longitudinal axis and encircled by a pair of the opposing curved surfaces, the drift tube electrode arrangement configured to direct ions from a first end to a second end of the drift tube electrode arrangement.

22. The method of claim 18, wherein the pairs of opposing curved surfaces are defined by a pair of respective concentric structures.

23. The method of claim 18, wherein the pairs of opposing curved surfaces form a single coiled structure.

24. The method of claim 18, wherein the pairs of opposing curved surfaces form a pair of coiled structures.

* * * * *